US012328488B2

(12) United States Patent
Mishra et al.

(10) Patent No.: US 12,328,488 B2
(45) Date of Patent: Jun. 10, 2025

(54) SYSTEMS, METHODS AND COMPUTER PRODUCTS FOR DYNAMIC SEGMENT RESOLUTION AND TRANSFERRING DYNAMIC-SEGMENT METADATA ACROSS MEDIA PLAYBACK DEVICES

(71) Applicant: Spotify AB, Stockholm (SE)

(72) Inventors: Manish Kumar Mishra, Berlin (DE); Radosław Miazio, London (GB)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/330,882

(22) Filed: Jun. 7, 2023

(65) Prior Publication Data

US 2024/0414417 A1   Dec. 12, 2024

(51) Int. Cl.
    *H04N 7/10*       (2006.01)
    *H04N 7/025*      (2006.01)
    *H04N 21/84*      (2011.01)
    *H04N 21/845*     (2011.01)

(52) U.S. Cl.
    CPC .......... *H04N 21/845* (2013.01); *H04N 21/84* (2013.01)

(58) Field of Classification Search
    CPC .............................. H04N 21/845; H04N 21/84
    See application file for complete search history.

(56) References Cited

U.S. PATENT DOCUMENTS

| 10,834,158 | B1 | 11/2020 | Bourgoyne et al. |
| 10,887,671 | B2 | 1/2021 | Garmark et al. |
| 10,911,815 | B1 | 2/2021 | McCarthy et al. |
| 2010/0030808 | A1* | 2/2010 | Ress ................ H04N 21/4333 709/227 |
| 2011/0307924 | A1 | 12/2011 | Roberts et al. |
| 2013/0097634 | A1 | 4/2013 | Jin et al. |
| 2013/0325869 | A1* | 12/2013 | Reiley ................ G06F 16/437 707/741 |
| 2014/0044127 | A1* | 2/2014 | Li ..................... H04L 67/5682 370/389 |

(Continued)

FOREIGN PATENT DOCUMENTS

| WO | 2008128037 | 10/2008 |
| WO | 2009045560 | 4/2009 |

OTHER PUBLICATIONS

Steadman, Mark, "Grow Your Business with DAI", published Feb. 9, 2022, obtained Mar. 28, 2023 online at: https://origin.fm/blog/dai/, 7 pages.

*Primary Examiner* — Gigi L Dubasky
(74) *Attorney, Agent, or Firm* — McDonnell Boehnen Hulbert & Berghoff LLP

(57) ABSTRACT

Systems, methods and computer program products provide dynamic segment resolution and transfer dynamic-segment metadata across media playback devices by detecting a transfer signal indicating a playback session is to be transferred from a first media playback device to a second media playback device, where the playback session contains first dynamic-segment metadata corresponding to a first dynamic-segment having a first data format. Second dynamic-segment metadata corresponding to a second dynamic-segment having a second data format is retrieved and the second media playback device is controlled to play the second dynamic-segment using the second dynamic-segment metadata, where the first data format and the second data format are different.

20 Claims, 8 Drawing Sheets

(56) References Cited

U.S. PATENT DOCUMENTS

| | | | |
|---|---|---|---|
| 2014/0258373 A1* | 9/2014 | Lerman | G06F 16/14 |
| | | | 709/203 |
| 2015/0206168 A1* | 7/2015 | Boggs | H04N 21/23424 |
| | | | 705/14.4 |
| 2015/0293928 A1 | 10/2015 | Chen et al. | |
| 2018/0225676 A1 | 8/2018 | Yruski et al. | |
| 2018/0367823 A1 | 12/2018 | Brinkley et al. | |
| 2019/0149858 A1* | 5/2019 | Oh | H04N 21/2387 |
| | | | 725/116 |
| 2020/0413163 A1 | 12/2020 | Aher et al. | |
| 2022/0345839 A1* | 10/2022 | Proctor, Jr. | H04L 12/2838 |
| 2024/0144977 A1 | 5/2024 | Mishra | |

* cited by examiner

SYSTEMS, METHODS AND COMPUTER PRODUCTS FOR DYNAMIC SEGMENT RESOLUTION AND TRANSFERRING DYNAMIC-SEGMENT METADATA ACROSS MEDIA PLAYBACK DEVICES

FIELD

Example aspects described herein relate generally to content distribution systems, and more particularly to resolving dynamic segments and transferring dynamic-segment metadata across media playback devices.

BACKGROUND

Modern day media content delivery systems operate to provide different types of media content to different types of client devices. The media content may include music, podcasts, videos, games, books, text, and the like, as well as webpage content, advertisements, professionally and non-professionally generated content, search results, blogs, and the like. In some implementations, playlists are provided to the client devices which, in turn, use the playlists to retrieve media content items by streaming or downloading them. A typical playlist, for example, contains lists of links that are used to retrieve corresponding media content items (e.g., a music content item, a video content item, a textual content item, etc.) from the media delivery system. Hardcoding a list of media content items into a playlist enables different types of media content items to be mixed. Additional data about the content items can be obtained using links as well. For example, music-talk or podcast content can be distributed as streams or files, through feeds containing multiple metadata fields.

One way content providers generate an episode of a music-talk show or podcast is by selecting particular media content items (e.g., music tracks or video content items) to go along with a talk portion of the show or podcast. The talk portion of an episode of a show or podcast can consist of individual segments, allowing a content provider to mix particular talk segments with a variety of media content items (e.g., music tracks). For this type of episode format, from a listener's perspective, a music-talk show or podcast episode is a set of segments, where a segment is either, for example, a media content item (e.g., a music track) or a talk track.

Creators want to create episodes in which they can inject not only media content that does not change (i.e., static content) such as creator selected music tracks or video content items, but other constantly changing media content (i.e., dynamic content) such as world news, local news, business news, horoscope snippets, and the like. Creators also want the ability to personalize such dynamic content according to the user, environment, context, or other factors.

RSS, or Really Simple Syndication, is a web feed format used to publish frequently updated content, such as blog posts, news headlines, audio, and video, in a standardized XML file format. RSS allows users to subscribe to content from multiple sources and have it delivered to a single place, known as an RSS reader or aggregator. Publishers and advertisers, for example, incorporate advertisements (ads) into RSS feeds and keep them refreshed. One common approach is to use dynamic ad insertion, where the ad content is inserted into the RSS feed on the fly, based on user preferences and targeting criteria. This allows advertisers to update their ad content and targeting parameters in real-time, and for publishers to generate revenue from the ads displayed in their feeds. Another approach is to use server-side scripting to refresh the ads in the RSS feed periodically. This can be done by embedding a small script in the feed that queries the ad server and retrieves the latest ad content.

RSS conventionally has not been used for injecting content into podcasts because RSS is a syndication format used for distributing content, rather than for modifying or manipulating content. Podcasts can be distributed through RSS feeds, which provide information about the podcast's title, description, and episode content, as well as the location of the media files for each episode. However, the actual media files for the podcast episodes are not typically included in the RSS feed itself but are hosted separately on a media server. To inject content into a podcast episode, such as inserting an ad or updating the episode with new content, a different approach must be used. There is presently no known mechanism for dynamic media file replacement.

One related technical challenge with enabling dynamic media file replacement is that existing systems do not provide ways in which to insert media content into a stream of content at runtime, much less where the media content consists of real-time content. In the context of media delivery, "runtime" refers to the period during which the content is being delivered to the end-user. This includes both live streams and on-demand content, such as podcasts or video-on-demand services. This can limit the flexibility and effectiveness in delivering dynamic content to users, particularly in situations where personalized or targeted content is desired.

Existing media content delivery systems also do not provide a mechanism for creators to apply different types of data formats of dynamic content within the framework of a typical episode such that a user operating one type of media playback device (e.g., a mobile client device) can transfer a playback session to another type of media playback device (e.g., a TV embedded client device) and have that other type of media playback device seamlessly take over the playback session, particularly where the data format of the media content item playing back on the first type of media playback device is different from the data format of the media content item to be played back by the second media playback device that is taking over the playback session.

One technical challenge with enabling a seamless transfer of a playback session involves determining the capabilities of the second device. Even if there were the ability to detect the capabilities of the second device, another technical problem involves efficiently switching from one media content item to another media content item during the transfer of a playback session without having to have the two media playback devices transfer an entire media content file. Yet another technical problem involves providing the content creator controls to select the most appropriate options for the second media playback device.

SUMMARY

The present disclosure provides methods, systems and non-transitory computer-readable products for transferring dynamic-segment metadata across media playback devices. In an embodiment, a method for transferring dynamic-segment metadata across media playback devices is provided. The method comprises: detecting a transfer signal indicating a playback session is to be transferred from a first media playback device to a second media playback device, the playback session containing first dynamic-segment metadata corresponding to a first dynamic-segment having a first data format; retrieving second dynamic-segment metadata corresponding to a second dynamic-segment having a second data format; and causing the second media playback device to play the second dynamic-segment using the second dynamic-segment metadata, wherein the first data format and the second data format are different.

In some embodiments, the method further comprises: determining, based on the first dynamic-segment metadata, that the first dynamic-segment corresponds to the first data format; obtaining one or more client device characteristics for the second media playback device that identifies one or more types of data formats that the second media playback device is capable of processing; and obtaining the second dynamic-segment based on the one or more client device characteristics.

In some embodiments, the method further comprises: obtaining, from the first dynamic-segment metadata, two or more media content items corresponding to the first dynamic segment, wherein the two or more media items correspond to different data formats; and communicating to the second media device the two or more media content items. In some examples, each of the two or more media content items is a unique identifier for obtaining a corresponding media content item. In some examples, the different data formats include any one of (a) an audio format, (b) a video format, (c) a text format, (d) a browser format, or (e) an image format. In some examples, the different data formats include combinations of (a) an audio format, (b) a video format, (c) a text format, (d) a browser format, and (e) an image format.

In some embodiments, the method further comprises: generating the transfer signal according to a change of location of the first media playback device. In some embodiments, the method further comprises: generating the transfer signal according to a detection of a playback transfer command received by the first media playback device or the second media playback device.

In some embodiments, the method further comprises: upon detecting the playback transfer signal, communicating playback context information corresponding to the playback session on the first media playback device to the second media playback device; and causing the second media playback device to play the second segment according to the playback context information.

The method, in some embodiments, further comprises: deleting data associated with the second segment from the first device if the playback session has been playing on the first media playback device for a predetermined amount of time.

In some embodiments, the playback session includes one or more dynamic segments and one or more static segments, and wherein the first segment is a dynamic segment. In some embodiments, the first segment and the second segment correspond to different versions of the same media content item.

The method, in some embodiments, further comprises: causing the first media playback device to play audio content of the second dynamic segment; and wherein causing the second media playback device to play the second dynamic-segment using the second dynamic-segment metadata causes the second media playback device to play non-audio content of the second dynamic-segment in synchrony.

In some embodiments, the method further comprises: receiving a request for episode metadata corresponding to an episode; determining the episode metadata includes one or more dynamic segments; retrieving dynamic-segment metadata associated with the request; and providing dynamic-segment metadata to a client device associated with the request. In another aspect, the method further comprises: determining a dynamic-segments database contains dynamic-segment metadata corresponding to the request; and injecting the dynamic-segment metadata into the episode metadata. In yet another aspect, the method further comprises: determining a dynamic-segments database does not contain dynamic-segment metadata corresponding to the request; causing one or more dynamic-segments transformers to resolve the dynamic-segment metadata, thereby obtaining resolved dynamic segment metadata; injecting the resolved dynamic-segment metadata into the episode metadata; and storing the resolved dynamic-segment metadata in the dynamic-segments database. In some embodiments, the method further comprises: resolving for the dynamic-segment metadata, by the one or more dynamic-segments transformers, by communicating a dynamic-segment media content request to one or more dynamic segments provider systems; and receiving, from the one or more dynamic segments provider systems, the resolved dynamic-segment metadata.

In some embodiments, the method comprises: determining a dynamic-segments database does not contain dynamic-segment metadata; obtaining, from a dynamic segments provider system, the dynamic-segment metadata, thereby obtaining resolved dynamic-segment metadata; injecting the resolved dynamic-segment metadata into the episode metadata; and storing the resolved dynamic-segment metadata in the dynamic-segments database.

In yet other embodiments, the method further comprises: generating dynamic-segment metadata including static-segment metadata and dynamic-segment metadata, where the static-segment metadata does not change between playbacks of the episode and the dynamic-segment metadata changes between at least two playbacks during a predetermined time interval.

In some embodiments, the method further comprises: retrieving, from a segments database, prestored-segment metadata corresponding to at least one of the plurality of segments forming the episode, the prestored-segment metadata including static-segment metadata and dynamic-segment metadata. The static-segment metadata includes: a static-segment identifier for retrieving the corresponding static media content item and the dynamic-segment metadata includes: a dynamic-segment identifier.

In some embodiments, there is provided a non-transitory computer-readable medium having stored thereon one or more sequences of instructions for causing one or more processors to perform the methods described herein.

In some embodiments, there is provided a system for transferring dynamic-segment metadata across media playback devices, comprising: one or more processors; and memory storing one or more programs including instructions configured to be executed by the one or more processors and causing the one or more processors to perform the methods described herein.

BRIEF DESCRIPTION OF DRAWINGS

The features and advantages of the example embodiments of the invention presented herein will become more apparent from the detailed description set forth below when taken in conjunction with the following drawings.

DESCRIPTION

Figure 1:
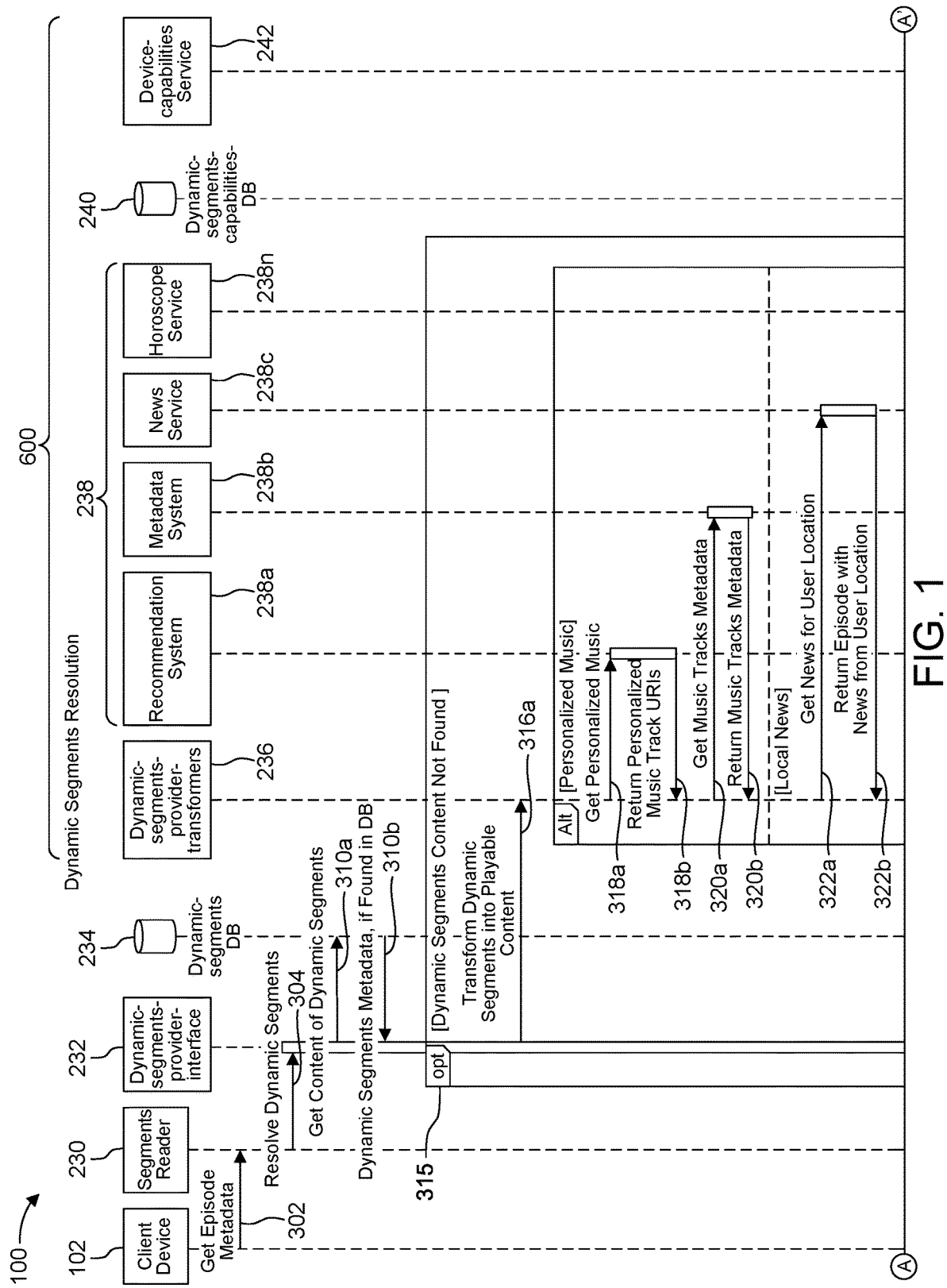
FIG. 1 is a system-flow diagram of a dynamic segmentation architecture, according to an example embodiment.
Figure 1:
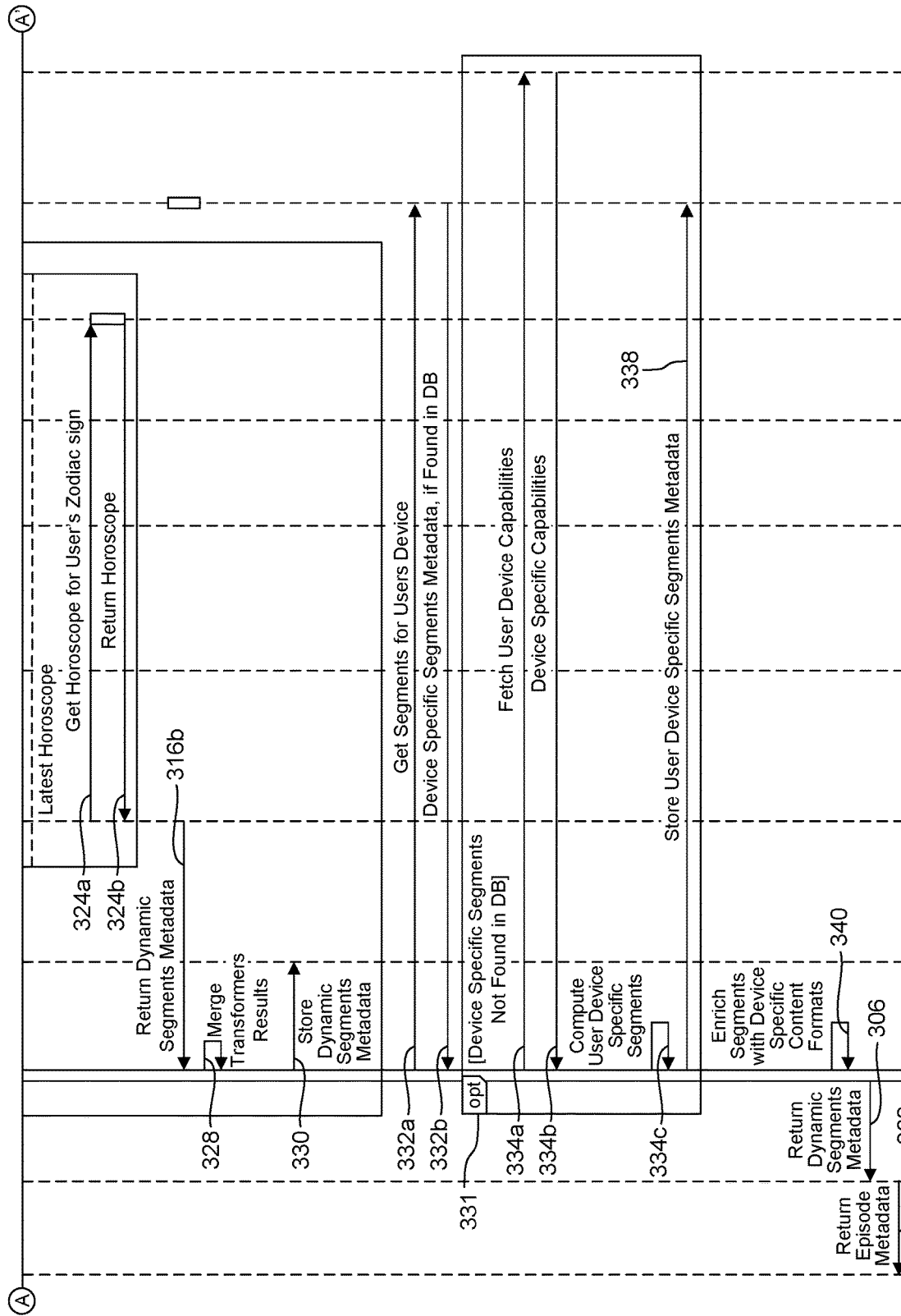

"Client device characteristics," as used herein, generally refers to features and capabilities of a client device (e.g., a media playback device) that can affect the quality and performance of media playback. Examples of client device characteristics include:
  Display capabilities: the type of display capabilities of the client device, and/or whether the client device has a built-in screen or requires an external display device to play media files containing video content.
  Audio capabilities: the type of speaker or audio output capabilities/features of the client device, such as high fidelity, Dolby Atmos, or surround sound.
  Reproduction capabilities: the features of the client device that enable it to accurately reproduce media content, including factors such as frame rate, color accuracy, and dynamic range.
  Connectivity capabilities: the connectivity options of the client device (e.g., Wi-Fi, Bluetooth, USB, HDMI, Ethernet, etc.), which can affect its compatibility with other devices and services, such as smartphones, tablets, computers, and smart TVs. For example, Bluetooth connectivity can allow audio streaming to wireless headphones, and HDMI connectivity can enable connection to a TV or projector for larger screen playback and integration with sound systems.
  User interface options: the types of control, navigation and interfaces that affect the user experience of the client device, including, for example, whether the client device has a user-friendly interface, responsive buttons, touch screens, and navigation options, as well as features that enable the client device to be controlled remotely, such as through a remote control or smartphone app. Examples of user interfaces include interfaces that allow users to navigate through their media files and access different features, such as playlists, equalizer settings, and media streaming services.
  Supported formats: the types of formats of media files that are supported by the client device, such as MP3, WAV, AAC, FLAC, H.264, MPEG-4, AVI, MP4, and on the like.
  Storage capacity: the amount of storage capacity the client device has for storing media files.
  Battery life: a measurement of the duration for which a battery can provide electrical power to the client device before it needs to be recharged or replaced.
  Operation System versions: the software version of the operating system the client device runs.

"Dynamic-segment metadata," as used herein, generally refers to metadata that can change over time or based on specific events or conditions. Dynamic-segment metadata is a type of metadata that is typically set for a dynamic segment, which is a segment or a portion of a segment that does not remains consistent in each episode within a show or podcast and thus changes. For example, the metadata associated with news may change as the page is updated with new content, or the metadata for the type of media content item (e.g., text, video, audio only, etc.) may change based on certain conditions (e.g., user interaction, user location, time of day, type of device used for playback, etc.). Dynamic-segment metadata can include playback context information.

An "edge device," as used herein, generally refers to a type of device that is located at the periphery of a network, closer to where data is generated, collected, or used. Edge devices, in some implementations, can be small, low-power devices that are designed to perform specific functions, such as collecting and processing data, or controlling other devices. Examples of edge devices include smart sensors, routers, gateways, smart televisions, and mobile devices. These devices are connected to the internet or a local network and can communicate with other devices or cloud-based services. In some implementations, the data associated with the edge device(s) is processed at the edge of a network, rather than in a central location. By processing data closer to where it is generated, edge devices can reduce latency and improve performance, as well as reduce the amount of data that needs to be transmitted to the cloud or other central location.

An "episode," as used herein, generally refers to one part of a show or podcast that is communicated (e.g., broadcast, streamed, downloaded, etc.) in the form of one or more media files. A podcast episode, for example, is one or more recordings from the entire podcast.

"Episode metadata," as used herein, generally refers to data regarding an episode. Example episode metadata includes any one or a combination of a segment identifier for retrieving the corresponding media content item, a start position corresponding to a beginning of the segment, a stop position corresponding to an end of the segment, a source identifier indicating a source of media content from which to retrieve a media content item, and an item number indicator indicating a number of media content items to retrieve from the source of media content. In some embodiments, episode metadata includes a segment position defining a position in the episode that a corresponding media content item is to be played relative to other segments within an episode. Thus, a content creator may initially arrange segment positions that can be changed (e.g., by shuffling the segments, receiving instructions via a user interface to rearrange the segments to a preferred order, and/or receiving a selection of one segment from a set of other segments to play at a particular time). Episode metadata can include dynamic-segment metadata and/or static-segment metadata.

A "link" or "media content item identifier," as used herein, generally is a unique identifier that represents a specific piece of content on a media distribution platform. In some embodiments, it is a string of characters that includes a code that identifies content, such as a song, voice command or speech, video, artist, album, playlist or other identifiable type of content. A link such as a URI (uniform resource identifier), for example, can be used to share and link to content on a media distribution platform, and can be used in various ways such as embedding a media content item in a website, adding a media content item to a playlist, or sharing a link. For example, a Spotify URI for the song "Song Title" by Artist can be coded as "spotify: track: 7azZff4dY11WllzX7mPB13". This link uniquely identifies this song on the Spotify platform and can be used to access the song through the Spotify API or to share the song with others.

"Middleware," as used herein, generally refers to software that sits between two or more applications or systems, providing a communication layer that allows them to exchange data and interact with each other. Middleware acts as a bridge between applications, enabling them to share data and services without requiring them to know the details of each other's underlying architecture or programming languages. Middleware also refers to components used in distributed computing environments, where multiple applications or systems are spread across different machines or locations. Middleware can be used to provide a variety of services, such as message queuing, remote procedure calls, data caching, and transaction processing.

"Playback context information," as used herein, generally refers to metadata about a media content item being played, a playback device through which the media content item is being played, a playback environment, a user's preferences or behavior, information about the current playback position of the media content item, and the like. For example, playback context information might include details about the artist, album, and track being played, as well as information about the playback device, such as the type of speaker or headphones being used. It might also include information about the playback environment, such as the volume level, equalization settings, and any other audio effects being applied.

"Playback position," as used herein, generally refers to the point in a media content item where playback is currently paused or ongoing. This information can, for example, be stored as a timestamp or a frame number within the media file. In the case of music playback, for example, playback position would indicate the current point in the song where playback is occurring. This information can be used by media players and other applications to resume playback from the same position after an interruption, or to provide a visual representation of the song's progress.

A "segment" or "episode segment," as used herein, generally refers to each of the parts into which an episode is or may be divided. In an example implementation, media content of a segment is represented by one or more links (defined above).

A "show" or "podcast," as used herein, generally refers to a collection of segments that are produced and distributed on a regular basis. Each segment is a self-contained set of media content items (e.g., one or more media content items). While a show or podcast may consist of a single segment or multiple segments that are arranged in a specific order, aspects of the embodiments provided herein more flexibility for content creators in how they arrange or modify the content and/or order of the segments. The segments can be standalone media content items, such as interviews, news updates, or commentary, or they can be part of a larger narrative or story arc. In addition, a segment can contain static content and/or dynamic content.

"Static-segment metadata," as used herein, generally refers to metadata that is fixed and does not change, such as the file size, format, and creation date. Static-segment metadata is a type of metadata that is typically set for a static segment, which is a segment that remains consistent in each episode or at regular intervals within a show or podcast when an episode is created and does not change. A static segment also is sometimes referred to as a fixed segment. Static-segment metadata can include playback context information.

FIG. 1 is a system-flow diagram of a dynamic segmentation architecture 100, according to an example embodiment. The example dynamic segmentation architecture 100 includes a client device 102, a segments reader 230, a dynamic-segments provider interface 232, a dynamic-segments database (DB) 234, one or more dynamic-segments provider transformers 236, one or more dynamic-segments provider systems 238 (e.g., a recommendation system 238a, a metadata system 238b, a news service 238c, . . . , a horoscope server 238n, etc.), a dynamic-segments capabilities DB 240, and a device capabilities service 242. Collectively, the one or more dynamic-segments provider transformers 236, the one or more dynamic-segments provider systems 238, the dynamic-segments capabilities DB 240, and the device capabilities service 242 are referred to as a dynamic-segments provider system 600.

Generally, dynamic segmentation is provided by receiving a request, from client device 102, for episode metadata corresponding to an episode (get episode metadata operation 302), determining the episode metadata includes one or more dynamic-segments (resolve dynamic-segments operation 304), retrieving dynamic-segment metadata associated with the request (return dynamic-segment metadata operation 306), and providing dynamic-segment metadata to a client device associated with the request (return episode metadata operation 308).

In an example implementation, the dynamic segments come from other shows. Thus, dynamic-segment metadata, in some embodiments, can be derived from the episode metadata of other shows.

A mechanism for transferring dynamic-segment metadata across media playback devices is also provided. This enables the creation of episodes that contain a set of dynamic segments, the content for which can be created for different types of client devices.

Example Episode Including Static and Dynamic Segments. By way of illustration, an example episode (e) that contains two static segments and two dynamic segments, where the structure of episode (e) is created, as follows:

{Static Segment$_1$, Dynamic Segment$_1$, Static Segments$_2$, Dynamic Segments$_2$}.

Figure 2:
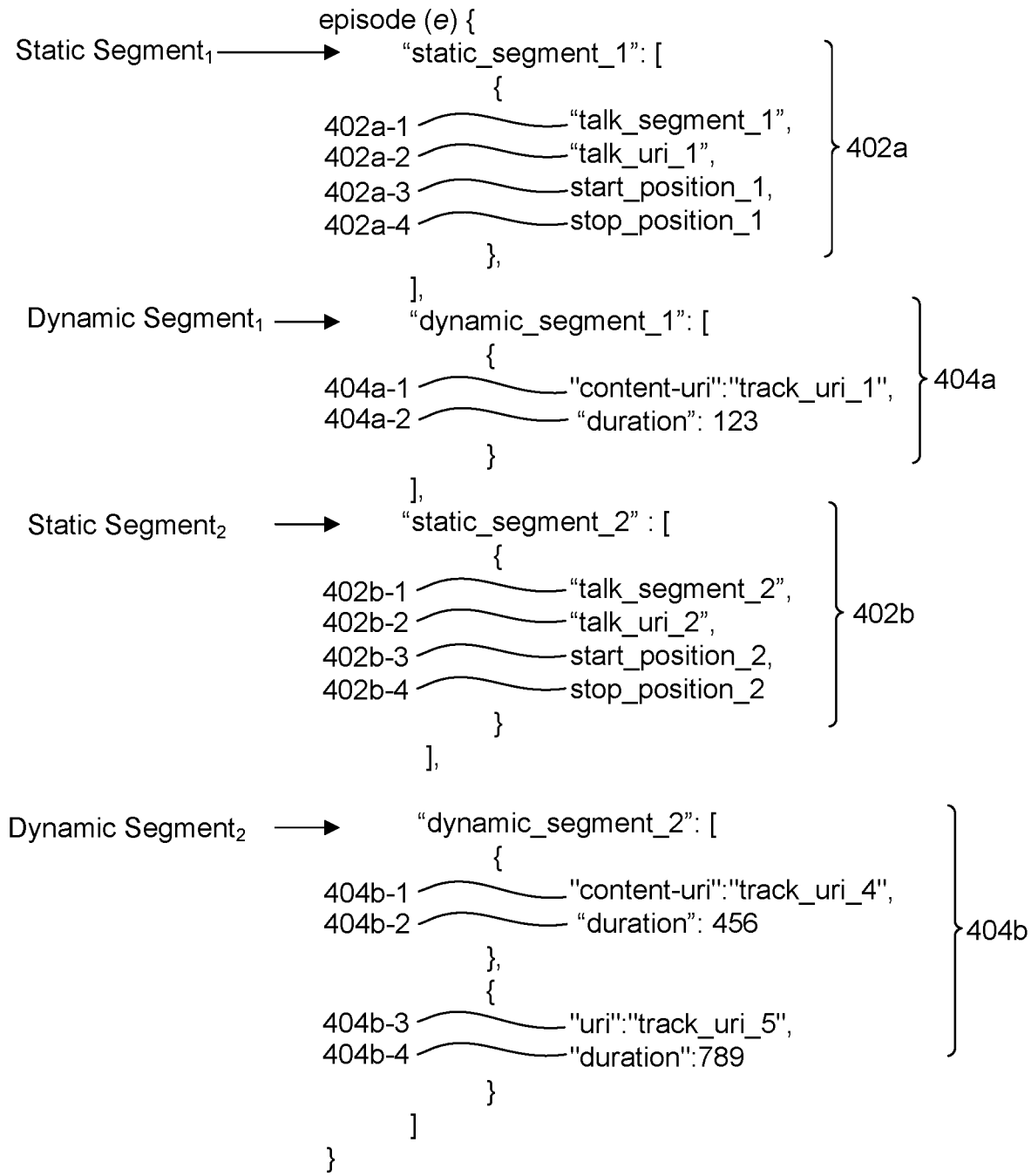
FIG. 2 illustrates a structure of an example episode (e) containing static-segment metadata and dynamic-segment metadata, according to an example embodiment.

FIG. 2 illustrates a structure of an example episode (e) containing static-segment metadata and dynamic-segment metadata, according to an example embodiment. In this example, episode (e) metadata particularly contains static-segment metadata 402 including first static-segment metadata 402a and second static-segment metadata 402b and dynamic-segment metadata 404 including first dynamic-segment metadata 404a and second dynamic-segment metadata 404b. The first static-segment metadata 402a corresponds to a first static segment and the second static-segment metadata 402b corresponds to a second static segment, and the first dynamic-segment metadata 404a corresponds to a first dynamic segment and the second dynamic-segment metadata 404b corresponds to a second dynamic segment. In this example implementation, first static-segment metadata 402a includes: a static-segment name 402a-1, a static-segment link 402a-2 for retrieving a corresponding media content item, a start position 402a-3 corresponding to a beginning of the first static segment, and a stop position 402a-4 corresponding to an end of the first static segment.

In this example implementation, first dynamic-segment metadata 404a includes a dynamic-segment link 404a-1 containing a content source identifier ("content-uri") corresponding to a content source and a track identifier ("track_uri_1") corresponding to a particular track to be obtained from the source. In this example, the first dynamic-segment metadata 404a also includes duration data 404a-2 defining a duration that the first dynamic segment is to be played.

In this example implementation, second static-segment metadata 402b includes: a static-segment name 402b-1, a static-segment link 402b-2 for retrieving the corresponding media content item, a start position 402b-3 corresponding to a beginning of the second static segment, and a stop position 402b-4 corresponding to an end of the second static segment.

In this example implementation, second dynamic-segment metadata 404b includes a first dynamic-segment link 404b-1 containing a content source identifier ("content-uri") corresponding to a content source and a track identifier ("track_uri_4") corresponding to a particular track to be obtained from the source. In this example, the second dynamic-segment metadata 404b also includes first duration data 404b-2 defining a duration that the first portion of the second dynamic-segment is to be played. Second dynamic-segment metadata 404b also includes a second dynamic-segment link 404b-3 containing a content source identifier ("content-uri") corresponding to a content source and a track identifier ("track_uri_5") corresponding to a particular track to be obtained from the source. In this example, the second portion of the second dynamic-segment metadata 404b includes second duration data 404b-4 that the second portion of the second dynamic-segment is to be played.

In an example use case,

{Static Segment$_1$, Static Segment$_2$} (i.e., first static-segment metadata 402a and second static-segment metadata 402b) corresponds to the talk content provided by a creator;

Dynamic Segment$_1$ corresponds to the latest episode from a first show, Show$_1$;

Dynamic Segment$_2$ corresponds to the latest episode from a second show, Show$_2$; and Show$_1$ releases new episodes every hour.

In this example use case, at any given time t, Show$_1$ has following episodes {$e_1, e_2, \ldots, e_n$}. After, for example, t-hour Show$_1$ will have a new episode {$e_{latest}, e_1, e_2, \ldots, e_n$}. If Show$_2$ keeps releasing new episodes every half an hour, at any given time t the Show$_2$ has the following episodes: {$e_1, e_2, \ldots, e_n$}. After t+1 hour, Show$_2$ will have two new episodes {$e_{latest1}, e_{latest2}, e_1, e_2, \ldots, e_n$}.

When a user listens via a client device 102 to the episode they receive the same static talk segment created by the creator, but content of dynamic segments is determined based on the time they consume the particular episode. For example, if a dynamic segment comes from a news provider, then a user who listens to the episode via a client device in the morning will receive morning news while a user who listens to the episode via another client device in the evening will receive evening news without any modification to the actual episode. Systems, methods, and computer-program products for dynamic segmentation are now further described in more detail.

In some embodiments, dynamic-segment metadata has a structure that contains both static- and dynamic-type metadata. For example, dynamic-segment metadata that is generated can contain segment metadata, where the segment metadata includes static-segment metadata and dynamic-segment metadata. In such embodiments, the static-segment metadata does not change between playbacks of the episode and the dynamic-segment metadata remains persistent after it is resolved. However, dynamic-segment metadata may be resolved more than once and may change each time it is resolved.

In some embodiments, dynamic-segment metadata is based on the time of day. For example, if a user is consuming news, dynamic news content that is retrieved can be selected based on the time provided by, for example, client device 102.

In some embodiments, the dynamic-segment metadata remains persistent for a predetermined time interval (e.g., 1 hour, 4 hours, 8 hours, 24 hours, 48 hours, . . . , n-hours). In an example implementation, the dynamic-segment metadata is cached on the client device 102. In yet another embodiment, a user of the client device 102 is provided with a selectable graphical element providing an option to update.

Client Device and Segments Reader Interactions. Referring to FIG. 1, client device 102 operates to request the segments reader 230 to retrieve episode metadata. In an example implementation, the request includes an account identifier, where the account identifier associates an account of a user with a media streaming service provider. Information corresponding to the account of the user, in some embodiments, is stored by the media streaming service provider. In an example implementation, the request also includes an episode identifier.

Ways of Resolving for Dynamic Segments. Still referring to FIG. 1, segments reader 230 operates to receive from the client device 102 a request for episode metadata and to resolve for any dynamic segments. That is, in some embodiments, segments reader 230 initiates a process that determines whether the episode metadata includes any dynamic-segment metadata.

In some embodiments, segments reader 230 executes the resolve dynamic-segments operation 304 by instructing the dynamic-segments provider interface 232 to resolve for dynamic segments. In the example implementation depicted in FIG. 1, dynamic-segments provider interface 232 resides between segments reader 230 and dynamic-segments DB 234, one or more dynamic-segments provider transformers 236, dynamic-segments capabilities DB 240, and device capabilities service 242.

Dynamic-segments provider interface 232 operates to perform various functions depending on the use case. Generally, dynamic-segments provider interface 232 operates to cause dynamic-segments metadata to be returned to segments reader 230 and ultimately to client device 102. This enables the client device to retrieve media content identified by the dynamic-segment metadata (e.g., using links contained in the dynamic-segment metadata).

Prestored Dynamic-Segment Metadata. In some embodiments, dynamic-segments DB 234 operates to prestore dynamic-segment metadata. Thus, in some use cases, dynamic-segments provider interface 232 operates to query the dynamic-segments DB 234 to check if data about what content should be injected into the episode has been prestored in dynamic-segments DB 234. If a dynamic segment has been processed before and dynamic-segment metadata obtained from resolving the dynamic segment has been prestored in dynamic-segments DB 234, then the prestored dynamic-segment metadata is retrieved and returned to client device 102 as part of a response to a request by the client device 102.

Figure 3:
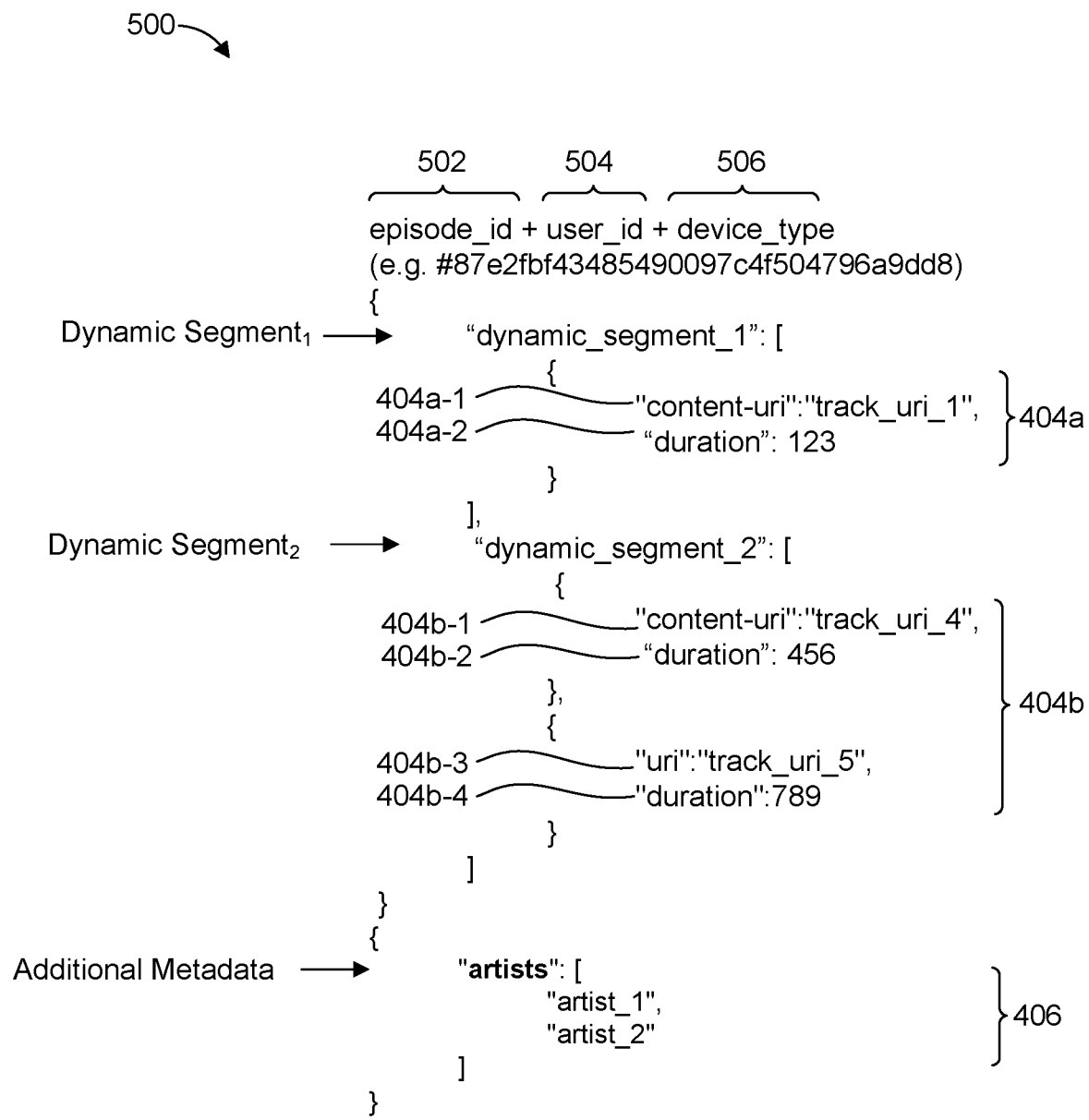
FIG. 3 illustrates an example of a structure of prestored dynamic-segment metadata according to some embodiments.

FIG. 3 illustrates an example of a structure of prestored dynamic-segment metadata 500 according to some embodiments. The example particulars of the dynamic segments, namely first dynamic-segment metadata 404a and second dynamic-segment metadata 404b are the same as described above in connection with FIG. 2. In this example embodiment, prestored dynamic-segment metadata 500 further includes an episode identifier (ID) 502 that is used to identify a particular episode of a show, a user ID 504 that identifies a particular user, and a device type 506 which identifies the type of device for which the prestored dynamic-segment metadata has been created. The device type 506, in some embodiments, is used by to identify client device characteristics.

Referring to FIG. 1, in some embodiments, a dynamic segmentation method includes a dynamic-segments query operation 310a that requests dynamic content by determining whether dynamic-segments DB 234 contains dynamic-segment metadata corresponding to the request for episode metadata. The request for episode metadata is illustrated in FIG. 1 as get episode metadata operation 302.

In the case where dynamic-segments DB 234 contains dynamic-segment metadata corresponding to the request for episode metadata, a dynamic-segment return operation 310b performs providing dynamic-segment metadata to dynamic-segments provider interface 232. Dynamic-segment return operation 310b can perform providing dynamic-segment metadata to dynamic-segments provider interface 232 by, for example, retrieving the dynamic-segment metadata from dynamic-segments DB 234. Dynamic-segments provider interface 232, in turn, performs a return dynamic-segment metadata operation 306 that returns the dynamic-segment metadata to segments reader 230. Segments reader 230, in turn, performs injecting the dynamic-segment metadata that has been resolved (also referred to as resolved dynamic-segment metadata) into the episode metadata and a return episode metadata operation 308 that performs providing the dynamic-segment metadata to client device 102.

The above example illustrates prestored-segment metadata that corresponds to segments forming at least a portion of an episode that is retrieved from a dynamic-segments DB 234 that includes dynamic-segment metadata for that episode. In some embodiments, the prestored-segment metadata can correspond to segments forming at least a portion of an episode that includes both static-segment metadata and dynamic-segment metadata for the episode.

Referring again to FIG. 3, in some embodiments, additional metadata 406 is prestored along with the dynamic-segment metadata 404a and dynamic-segment metadata 404b. In the example implementation illustrated by FIG. 3, the additional metadata contains artist metadata (artist_1 and artist_2).

Resolving Dynamic-Segment Metadata That Has Not Been Prestored or Resolved. If a particular dynamic segment has not been previously processed or resolved content for that particular dynamic segment has not been prestored in dynamic-segments DB 234, then dynamic-segments provider interface 232 further operates to obtain dynamic-segment metadata from dynamic-segments provider transformers 236. Thus, in some use cases, dynamic-segments query operation 310a and dynamic-segment return operation 310b operate in conjunction to perform determining that the dynamic-segments DB 234 does not contain dynamic-segment metadata associated with a requested episode. In an example implementation, this determination is indicated when dynamic-segment return operation 310b communicates to the dynamic-segments provider interface 232 that no dynamic-segment metadata was found for a particular episode.

In use cases where dynamic-segment metadata is not prestored in dynamic-segments DB 234, then a dynamic segment is resolved to obtain dynamic-segment metadata using the one or more dynamic-segments provider transformers 236. Block 315 of FIG. 1 depicts what occurs if dynamic-segment metadata for an episode is not found in dynamic-segments DB 234. Generally, if dynamic-segment metadata is not found in dynamic-segments DB 234, dynamic-segments provider interface 232 operates to transform the dynamic segments into playable content (operation 316a) by causing one or more dynamic-segments provider transformers 236 to resolve for dynamic-segment metadata, thereby obtaining resolved dynamic-segment metadata. In turn, the one or more dynamic-segments provider transformers 236 returns the dynamic-segment metadata, as illustrated by return dynamic-segment metadata operation 316b.

In some embodiments of the dynamic segmentation method, the one or more dynamic-segments provider transformers 236 returns the dynamic-segment metadata to dynamic-segments provider interface 232. Dynamic-segments provider interface 232, in turn, performs a return dynamic-segment metadata operation 306 that returns the dynamic-segment metadata to segments reader 230. Segments reader 230, in turn, injects the dynamic-segment metadata into the episode metadata and performs a return episode metadata operation 308 that performs providing the dynamic-segment metadata to client device 102. The result is the injection of the resolved dynamic-segment metadata into the episode metadata. In some embodiments, a dynamic-segment metadata store operation 330 performs storing the resolved dynamic-segment metadata in the dynamic-segments DB 234.

In some embodiments, a transformer result merge operation 328 is performed by dynamic-segments provider interface 232 to merge the responses from the one or more dynamic-segments provider transformers 236 into a single list of resolved dynamic segments (e.g., to return dynamic-segment metadata that is used to provide playable content to client device 102).

In some embodiments, if two or more dynamic-segments provider transformers 236 exist, then each of the two or more dynamic-segments provider transformers 236 are provided, by the dynamic-segments provider interface 232, a list of all the dynamic segments to resolve.

In an example implementation, dynamic-segments provider interface 232 operates to flatten all the dynamic segments as a set of dynamic segments and to pass the set of dynamic segments to one or more dynamic-segments provider transformers 236.

If a particular dynamic-segments provider transformer of the available dynamic-segments provider transformers 236 is not able to resolve a particular dynamic segment (e.g., a local news dynamic segment is not applicable), that particular dynamic segment transfer returns an empty response.

In some embodiments, the one or more dynamic-segments provider transformers 236 resolve for the dynamic-segment metadata by communicating a dynamic-segment media metadata request to one or more dynamic-segments provider systems 238 (e.g., a recommendation system 238a, a metadata system 238b, a news service 238c, . . . , a horoscope server 238n, etc.) and receiving, from the one or more dynamic-segments provider systems 238, the resolved dynamic-segment metadata. For example, recommendation system 238a can be used to resolve dynamic-segment metadata associated with personized music by retrieving personalized music (operation 318a) and returning personalized music tracks (operation 318b). Similarly, metadata system 238b can be used to resolve dynamic-segment metadata associated with music track metadata by retrieving music track metadata (operation 320a) and returning music track metadata (operation 320b). Similarly, news service 238c can be used to resolve dynamic-segment metadata associated with news content (e.g., for a user's location) by retrieving news content items (e.g., associated with the user's location) (operation 322a) and returning an episode with news content (e.g., from the user's location) (operation 322b). Other types of dynamic-segments provider systems 238 can be added. For example, a horoscope server 238n can be used to get a horoscope for a user's zodiac sign (operation 324a) and return horoscope content for the user (operation 324b).

Now known or future developed mechanisms for retrieving dynamic-segments from any one of the dynamic-segments provider systems 238 can be incorporated into the dynamic segmentation architecture 100.

Get Dynamic-Segment Metadata based on Client Device Characteristics. In some use cases, dynamic-segments provider interface 232 operates to query dynamic-segments capabilities database 240 to determine dynamic segment content that is available in a format best suited for client device 102. In an example implementation, this is determined based on the client device characteristics of the client device 102 (e.g., speaker only, audio and video, vehicle media system, smart hub, etc.).

Dynamic-segments provider interface 232 also can operate to determine the type of the device user is using based on a device type identifier (ID). The device type ID, in some embodiments, is used to identify client device characteristics of client device 102 (e.g., by mapping the device type ID to corresponding client device characteristics).

In an example embodiment, a device-type segment retrieval operation 332a performs querying the dynamic-segments capabilities DB 240 for dynamic-segment metadata corresponding to the client device 102 client device characteristics (e.g., client device type). In an example implementation, the device-type segment retrieval operation 332a maps an episode identifier and a device type ID associated with the client device 102 to a list of episode segments stored in dynamic-segments capabilities DB 240, where the episode identifier corresponds to the episode metadata the client device 102 requested be resolved in get episode metadata operation 302. In the case where dynamic-segment metadata corresponding to the episode identifier and the client device 102 type is found in dynamic-segments capabilities DB 240, a device-type segment return operation 332b returns dynamic-segment metadata for the corresponding dynamic segment that corresponds to the device-type of the client device 102.

In some embodiments, a user identifier also is mapped to the dynamic-segments capabilities DB 240. Accordingly, in some embodiments, dynamic-segment metadata corresponding to a dynamic segment corresponding to the device-type of the client device 102 can be retrieved using three items of information, the device type ID, an episode ID, and a user ID.

Device-Specific Segments Not Found. In some embodiments, a determination is made whether specific segments are available for a client device. This is illustrated by block 331. In an example embodiment, a fetch client device capabilities operation 334a performs retrieving client device characteristics ("fetch user device capabilities"). In an example embodiment, a device-specific capabilities return operation 334b returns one or more client device characteristics corresponding to client device 102. In turn, dynamic segments corresponding to the one or more client device characteristics corresponding to client device 102 are computed, as shown by compute client device-specific segments operation 334c. In turn, the dynamic-segment metadata corresponding to the computed client device-specific segments is stored in dynamic-segments capabilities DB 240 for later retrieval as illustrated by client device-specific segments metadata store operation 338. The computed client device-specific segments can be stored based on, for example, the device type ID, an episode ID, and a user ID as described above in connection with device-type segment retrieval operation 332a and device-type segment return operation 332b.

In some embodiments, dynamic-segments provider interface 232 operates to select which dynamic segments the client device should play back, as illustrated by device-specific enrichment operation 340. In an example implementation, dynamic-segment metadata is selected by dynamic-segments provider interface 232 based on one or more client device characteristics of the client device 102.

Change Notification. In some embodiments, a notification indicating a media content item identified by the dynamic-segment metadata has changed is provided to the client device 102. In turn, the client device 102 provides a notification via an interface of the client device 102 (e.g., via a notification message). In some embodiments, the user of the client device 102 can optionally select to playback the changed media content item. In some embodiments, playing back the changed media content item causes the dynamic-segment metadata corresponding to a corresponding episode to be updated. In some embodiments, the user of the client device 102 can optionally select to update the corresponding dynamic-segment metadata in dynamic-segments DB 234.

Figure 4:
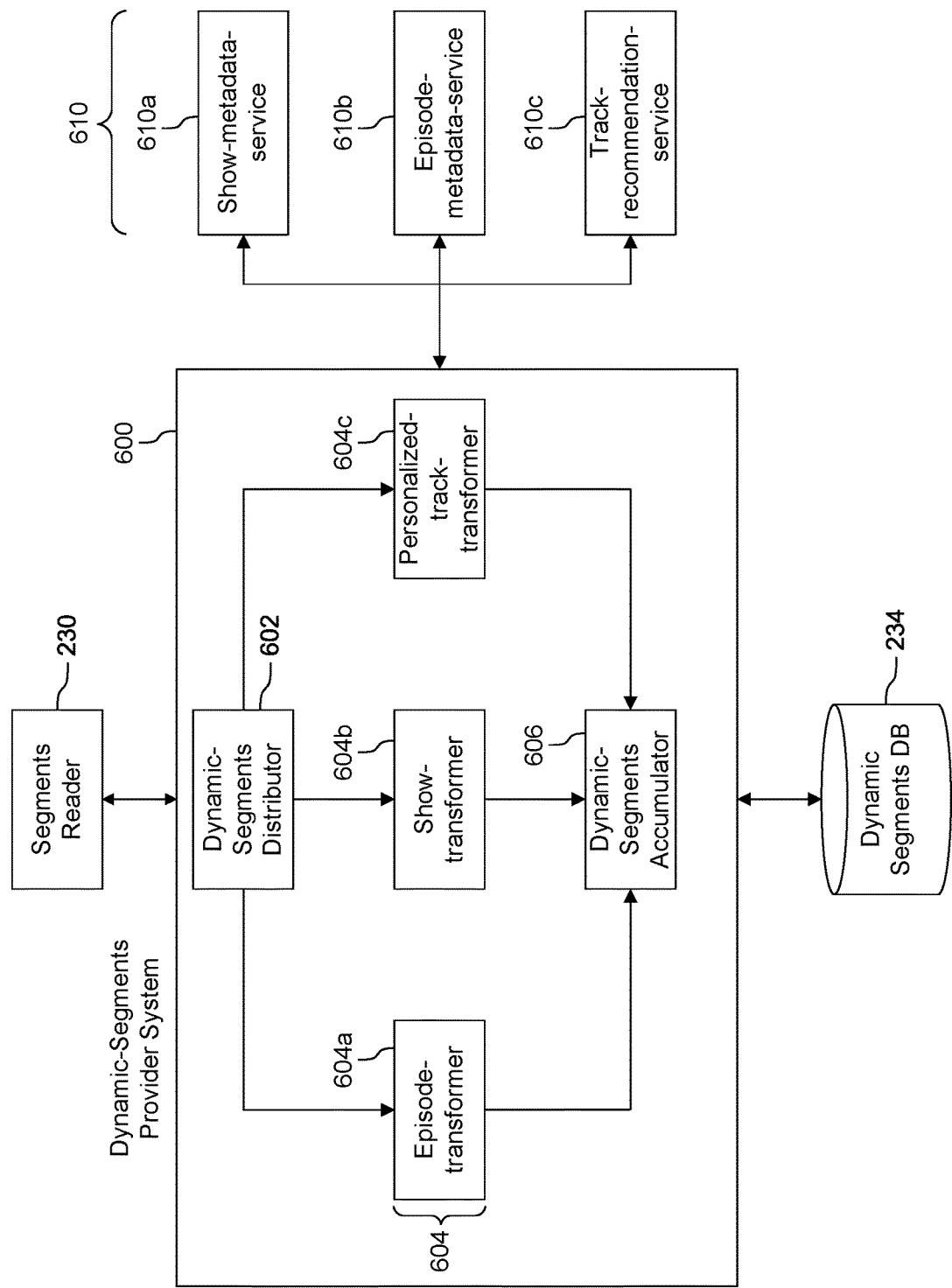
FIG. 4 illustrates a dynamic segments provider system, according to an example embodiment.

Dynamic-Segments Provider System. FIG. 4 illustrates a dynamic-segments provider system 600, according to an example embodiment. In some embodiments, dynamic-segment metadata that has been resolved for a dynamic segment is returned by one or more components of dynamic-segments provider system 600 to dynamic-segments provider interface 232, which in turn provides the dynamic-segment metadata to segments reader 230 to inject into the episode metadata provided to client device 102. In some embodiments, dynamic-segments provider interface 232 is a component of dynamic-segments provider system 600. In some embodiments, dynamic-segments provider interface 232 is part of segments reader 230.

In some embodiments, dynamic-segments provider system 600 includes a library of transformers and communicates directly with dynamic-segments provider interface 232.

As described above, dynamic-segment metadata, in some use cases, may not be prestored in dynamic-segments DB 234 and one or more dynamic-segments provider transformers 236 is used to resolve the dynamic-segments. Referring also to FIG. 1, in an example embodiment, dynamic-segments query operation 310a and dynamic-segment return operation 310b collectively perform determining that the dynamic-segments DB 234 does not contain dynamic-segment metadata. In turn, dynamic-segments provider system 600 operates to obtain the dynamic-segment metadata, thereby obtaining resolved dynamic-segment metadata. In some embodiments, dynamic-segments provider system 600 returns the resolved dynamic-segment metadata to segments reader 230. Segments reader 230, in turn, performs injecting the dynamic-segment metadata that has been resolved (also referred to as resolved dynamic-segment metadata) into the episode metadata and a return episode metadata operation 308 that performs providing the dynamic-segment metadata to client device 102.

Dynamic-segments provider system 600 includes a dynamic-segments distributor 602, dynamic-segments transformers 604, and a dynamic-segments accumulator 606. In an example embodiment, if a dynamic segment has been previously processed (i.e., resolved) and its corresponding dynamic-segment metadata has been prestored in the dynamic-segments DB 234, when segments reader 230 resolves for that particular dynamic segment, the prestored dynamic-segment metadata in the dynamic-segments DB 234 is returned. If the dynamic segment has not been previously processed (i.e., resolved), then dynamic-segments provider system 600 operates to flatten all the dynamic segments as a set of segments and that set of segments is passed to all the dynamic-segments transformers 604.

Generally, each of the dynamic-segments transformers 604 are a component which takes a set of dynamic segments and converts them into concrete segments (playable entities). The dynamic segments contain information about how to convert them to concrete segments.

In the example implementation shown in FIG. 4, three dynamic-segments transformers 604 are illustrated. Additional dynamic-segments transformers can be added to support different use cases. That is, dynamic-segments provider system 600 is extensible and can have added to it more transformers. In this example implementation, the dynamic-segments transformers include an episode transformer 604a, a show transformer 604b and a personalized track transformer 604c. In some embodiments, each of the dynamic-segments transformers 604 operates to generate a link (e.g., a URI) from a given dynamic segment. A dynamic-segments transformer 604 can generate a link (e.g., a URI) locally or it can request a service to perform this job. Metadata Services 610 operates to receive queries from dynamic-segments transformers 604. Once a link (e.g., a URI) is generated, the corresponding dynamic-segments transformer 604 communicates to metadata services 610 to get the relevant dynamic-segment metadata for the dynamic segment. If a dynamic-segments transformer 604 cannot resolve a dynamic segment, in some embodiments, that dynamic-segments transformer 604 will ignore the request. In an example implementation, dynamic-segments transformer 604 will return empty response when it cannot resolve the dynamic segment.

Dynamic segments accumulator 606 operates to collect concrete segments. Dynamic segments accumulator 606 also operates to reply to segments reader 230 and to write responses to the dynamic-segments DB 234.

In the example implementation depicted in FIG. 4, dynamic-segments transformers 604 operate to query the metadata services 610 to get the link (e.g., URI) for a dynamic segment or other metadata for entities such as a show, via a show-metadata service 610a, an episode via an episode-metadata service 610b, and a track via a track-recommendation service 610c, among others not shown in FIG. 4. To create a concrete segment along with its link (e.g., URI), in some implementations, the query information includes a duration, a name, and artist information.

In some embodiments, dynamic-segments transformers 604 may query a recommendation service to get the link (e.g., URL) for a segment. For example, in case of personalized tracks a mixologist service can be used to get personalized tracks for a given user and music source. In the example implementation depicted in FIG. 4, this can be performed by track-recommendation service 610c.

Figure 5:
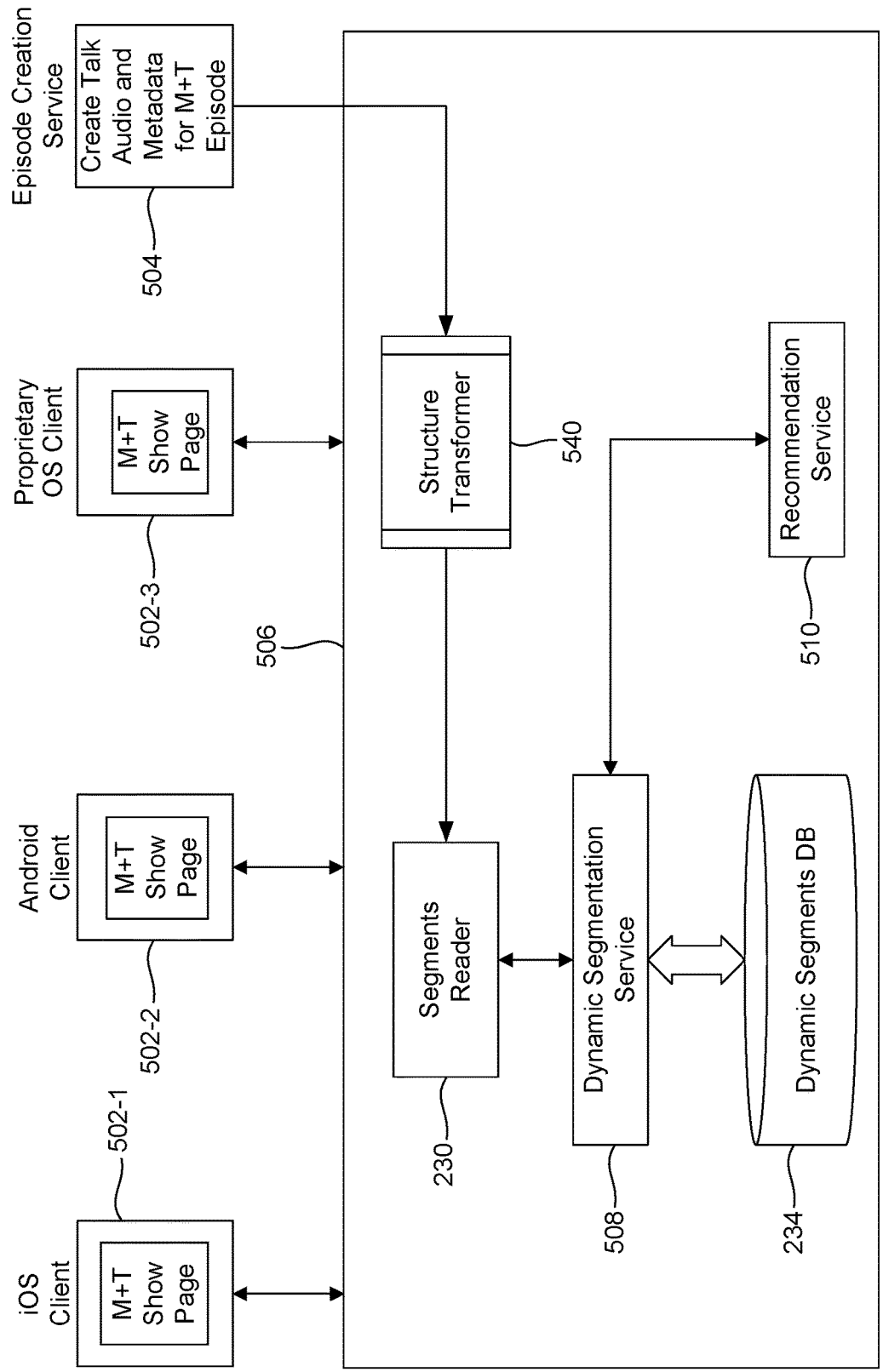
FIG. 5 is an implementation in which an episode consisting of music and talk segments is dynamically segmented, according to an example embodiment.

FIG. 5 is an implementation in which an episode consisting of music and talk segments is dynamically segmented, according to an example embodiment. In this example implementation, an episode creation service 504 creates a talk-audio episode together with metadata regarding one or more episodes, where the metadata includes static-segment metadata and dynamic-segment metadata. The episode content including the metadata is published for a media delivery system to deliver to clients such as a client device 502-1 (e.g., an iOS-based client device), a client device 502-2 (an android based client device), and a client device 502-3 (executing a proprietary operating system client device).

A structure transformer 540 operates to receive the episode media content and metadata and transform this information into a structure, referred to as an episode structure. The episode structure is capable of being delivered (e.g., processed, streamed, made available for download) via a delivery content system such as media delivery system 704 described in connection with FIG. 7. It should be understood that structure transformer 540 is not the same type of transformer as a dynamic-segments transformer 236 which operates to obtain dynamic-segment metadata.

In an example aspect, prior to communicating episode metadata to a client device the episode metadata is communicated to segments reader 230. In some embodiments, the segments reader 230, in turn, communicates the episode structure to a dynamic segmentation service 508 along with a request to resolve for dynamic segments in the episode metadata. The segments reader 230 thus causes the dynamic segmentation service 508 to resolve for any dynamic segments defined by the episode structure for dynamic-segment metadata. The segments reader 230, in some embodiments, causes the dynamic segmentation service 508 to resolve for any static segments defined by the episode structure for static-segment metadata.

In an example implementation, the dynamic segment is resolved for dynamic-segment metadata for a given episode identifier and a device-type identifier. The dynamic segment can also be resolved for dynamic-segment metadata for a given episode ID, a device-type ID, and a user ID.

The dynamic segmentation service 508 can also operate to provide an indication to the segments reader 230 whether any segment metadata is required to be resolved with dynamic-segment metadata. In other words, it may be the case that the episode metadata contains no dynamic segments to be resolved (e.g., because the episode metadata only contains static segments).

In an example embodiment, a recommendation service 510 operates to obtain personalized dynamic-segment data to be inserted into the episode metadata. This may be accomplished by making a call to a recommendation system such as recommendation system 238a of FIG. 1.

In some embodiments, the episode creation service 504 can indicate which episode segments should be resolved.

In some embodiments, an operator of a client device 502 (e.g., iOS client 502-1, Android client 502-2, Proprietary OS client 502-3) provides an instruction requesting the segments reader 230 to resolve for one or more dynamic segments in the episode metadata. If dynamic-segment metadata does not already exist, e.g., in dynamic-segments DB 234, segments reader 230 can make a call to a recommendation service 510. Recommendation service 510, in turn, can operate to obtain (e.g., from a recommendation system) dynamic-segment metadata that is personalized for the user.

In one example implementation, the episode metadata is provided by segments reader 230 directly to recommendation service 510 to resolve for dynamic segments. In another example implementation, the episode metadata is provided by segments reader 230 indirectly to recommendation service 510 via dynamic segmentation service 508. In yet another example implementation, the episode metadata is provided by segments reader 230, where segments reader 230 includes dynamic segmentation service 508.

In some embodiments, if dynamic-segment metadata does not already exist, e.g., in the dynamic-segments DB 234, dynamic segmentation service 508 (instead of segments reader 230) can make a call to recommendation service 510. Recommendation service 510, in turn, operates to obtain (e.g., from a recommendation system) dynamic-segment metadata that is personalized and insert the dynamic-segment metadata into the episode metadata returned to a client device.

In one example implementation, the episode metadata is provided by segments reader 230 directly to recommendation service 510. In another example implementation, the episode metadata is provided by segments reader 230 indirectly to recommendation service 510 via dynamic segmentation service 508.

In turn, segments reader 230 injects dynamic-segment metadata obtained by the recommendation service 510 into the episode metadata. In some embodiments, segments reader 230 further operates to cause the dynamic-segment metadata to be saved in dynamic-segments DB 234 for future retrieval. By saving the dynamic-segment metadata in the dynamic-segments DB 234, a call to a recommendation service 510 to repeat the process is not necessary. Instead, when a client device makes a call for episode metadata, segments reader 230 makes a call to dynamic segmentation service 508 to determine if the episode metadata has dynamic segments that have previously been resolved. Depending on the response, resolving the episode metadata, particularly any dynamic-segment metadata within the episode metadata, does or does not occur.

In some embodiments, a call to the dynamic segmentation service 508 to obtain updated segment metadata can be independently requested. For example, by an operator of a client device or by an operator of the dynamic segmentation service 508 (e.g., a user wishes an update or in the event the service provider is no longer licensed to play a particular track). In an example implementation, dynamic segmentation service 508, upon receiving an update instruction for one or more segments, can disregard the applicable segment(s) that has/have already been personalized. In an example use case, a user of a client device (e.g., client device 102 of FIG. 1 or client device 502 of FIG. 5) may decide they desire a recommendation system to provide updated segment metadata. The user can select via an interface of the client device one or more segments and select an instruction to cause an update (e.g., "update selected segments"). In turn, this instruction causes dynamic segmentation service 508 to update any corresponding segments.

In yet another implementation, if a user of the client device wishes to listen to the same previously resolved episode metadata, the dynamic segmentation service 508 can retrieve the resolved episode metadata from the dynamic-segments DB 234. Advantageously, this enables a user of a client device to maintain the same resolved dynamic-segment metadata without concern that it will be updated. Thus, a user can decide to update the dynamic-segment metadata (whether it has been previously resolved) and generate via the client device a request to the segments reader 230 to cause the dynamic segmentation service 508 to obtain new dynamic-segment metadata from the recommendation service 510. Optionally, a user can affirmatively issue an instruction to maintain previously resolved episode metadata. This enables more flexibility either through a client device 502 or by an episode creation service by enabling those entities to have more control over what segment metadata is resolved.

In some embodiments, a communication infrastructure is leveraged to render different output for dynamic segments according to the one or more client device characteristics of the client device. When a user plays an episode with dynamic segments for the first time, a dynamic-segments provider system can fetch and store all the supported links (e.g., URIs) for a dynamic segment. This enables audio, video, or text to be provided for a given dynamic segment. The response provided by the dynamic-segments provider system is shared with each of the clients and each client independently determines which type of content output to render according to its capabilities. For example, if it is a speaker device; it will choose audio output to render, if it is a television then the device may choose to render video output.

In an example implementation, the volume of data can be minimized by transferring only relevant links (e.g., URIs) for dynamic segments. When playing on a speaker, for example, there is no benefit of transferring video link. Therefore, no video link is transferred when playing on a speaker.

In some embodiments, a client device may also run a so-called connect application that connects devices that also support the connect application. When two or more devices use a particular application, such as the connect application, to communicate with each other, they can be referred to as compatible devices. As used herein, "compatible devices" or "devices", unless otherwise specified, generally means devices that are able to communicate with each other because they use the same application or technology. The client device for example, is a compatible device when it runs such a connect application.

Address Resolution Protocol (ARP): When a device communicates with another device on the same local network, it can use ARP to discover a Media Access Control (MAC) address of a target device. The ARP protocol broadcasts an ARP request packet to all devices on the local network, asking the device with the target IP address to respond with its MAC address.

Simple Service Discovery Protocol (SSDP): SSDP is a network protocol used for discovering and advertising network services. Devices that support SSDP can announce their presence on the network by sending SSDP discovery packets to a multicast address. Other devices on the network can listen for these packets and discover the available services.

Bonjour (formerly known as Zeroconf): Bonjour is a set of networking protocols that enables automatic discovery of devices and services on a local network. Devices that support Bonjour can advertise their services using multicast Domain Name System (mDNS) and multicast DNS Service Discovery (DNS-SD) protocols.

Universal Plug and Play (UPnP): UPnP is a set of networking protocols that enables devices to discover and interact with each other on a local network. Devices that support UPnP can advertise their services and capabilities by broadcasting discovery messages using the Simple Service Discovery Protocol (SSDP).

In an example implementation of a connect application run by the client device, the connect application first performs a discovery operation to discover compatible devices on the local network (e.g., using Address Resolution Protocol (ARP), Simple Service Discovery Protocol (SSDP), Bonjour, and Universal Plug and Play (UPnP)). When a compatible device is discovered, its IP address is obtained so that the connect application in both the compatible device and the client device can communicate.

In some implementations, once a compatible device has been discovered, the connect application sends an authentication request, for example, to a remote server. The authentication request from the compatible device includes a unique identifier for the device, which is generated based on its hardware and software characteristics. This unique identifier is used to verify that the compatible device can connect using the connect application. In some embodiments, for example during the authentication process or afterwards, the connect application sends account information of a user logged into the connect application. In some embodiments, the unique identifier includes at least one or more of an IP address, a device type, a manufacturer name, an embedded OS version, wireless compatibilities, and the like.

Once the device has been authenticated by the remote server, the remote server sends a handshake signal to the device. This handshake signal contains information about the audio stream that the device will be receiving, such as the audio format, bitrate, and encryption keys. The device, in turn, acknowledges the handshake signal and prepares to receive the media content (e.g., audio or video) stream.

With the handshake process complete, the connect application on client device can start streaming media content data directly to the other device. This is performed using, for example, a peer-to-peer streaming protocol.

While media content is streaming to the device, the connect application on the client can, in some embodiments, still control playback. This is done using, for example, a separate control protocol, which allows the connect application to cause different types of playback controls, such as pause, resume, skip tracks, and adjust the volume. The control protocol is also used to send metadata about the currently playing track, such as the title, artist, and album artwork.

The connect application, in some implementations, allows for multi-room playback, where you can play the same music on multiple devices at the same time. This is accomplished by creating a "group" of devices in the connect application and sending the audio stream to all of them simultaneously. The devices then synchronize their playback so that the music is synchronization across all of them.

Figure 6:
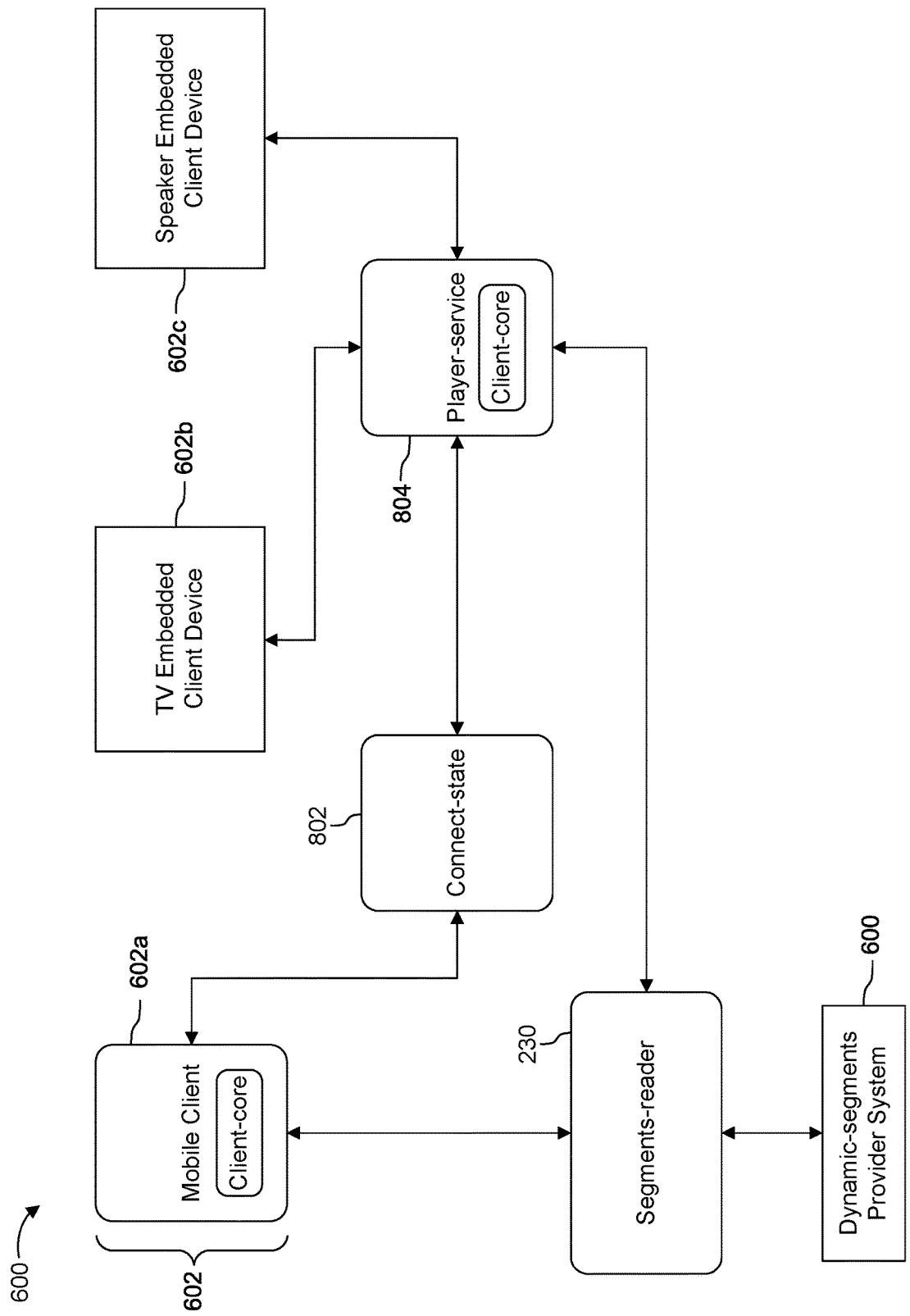
FIG. 6 is a system-flow diagram of a client device connect service for transferring dynamic-segment metadata across media playback devices, according to an example embodiment.

FIG. 6 is a system-flow diagram of a client device connect service 600 for transferring dynamic-segment metadata across media playback devices, according to an example embodiment. Generally, a first client device, such as mobile client device 602*a* retrieves two or more types of dynamic-segment metadata associated with a dynamic segment of an episode. In an example use case, first dynamic-segment metadata may correspond to a dynamic segment that streams audio-type data, whereas second dynamic-segment metadata is associated with a dynamic segment that streams video-type data. Additional types of dynamic-segment metadata may be used, such as text-type data (e.g., text data such as lyrics data), image-type data, and the like.

A connect-state service 802 (e.g., performed by a connect application) is configured to provide information corresponding to client devices, and corresponding playback context information. As such, the component checking the playback context information of a particular client device can operate to orchestrate transferring dynamic-segment metadata across media playback devices. A player service 804 operates orchestrate the transfer of dynamic-segment metadata across media playback devices. Player service 804 can be incorporated into one or more of the first client device (e.g., performed by a connect application), the second client device (e.g., performed by a connect application), an edge device, a backend server, and a middleware component.

In the example use case depicted in FIG. 6, the first client device (the mobile client device 602*a*) detects a playback transfer signal. Detecting a playback transfer signal by the first client device causes the current playback session to be paused on the first client device and to resume on a second client device (e.g., TV embedded client device 602*b*). In some embodiments, the current playback session can be paused and subsequently resumed after transmission of the playback transfer signal is completed. Additionally, the current playback session may be resumed in conjunction with the resumed playback on the second client device. In another non-limiting example embodiment, the current playback session can be resumed either upon or after the transmission of playback transfer signal.

The connect-state service 802 in conjunction with the player service 804 enable components (e.g., an edge device, backend server or middleware component) to control a playback session of other components (e.g., first client device and second client device). In some embodiments, the playback transfer signal is received and processed by an edge device. In some embodiments, the playback transfer signal is received and processed at a backend server. In some embodiments, the playback transfer signal is received and processed by a middleware component.

In some embodiments, the playback transfer signal is automatically generated (e.g., triggered) based on a change in the location of the first client device. In some embodiments, the playback transfer signal is generated by detecting a command at the first client device (e.g., via a user interface of the first client device). In some embodiments, the playback transfer signal is generated by detecting a command at the second client device (e.g., via a user interface of the second client device).

In some embodiments, the playback transfer signal could be generated based on the proximity of the first client device to the second client device. In an example implementation, UWB (ultra wide band), BT (Bluetooth) and BTLE (Bluetooth Low Energy) proximity sensing are used to rely on Bluetooth radio waves to detect the proximity of the first client device to the second client device. When the first client device and the second client device are in range of each other, they can establish a connection and communicate with each other. Proximity sensing works by measuring the signal strength of the Bluetooth radio waves between the two client devices. As the distance between the two client devices increases, the signal strength decreases. By measuring the signal strength, a device can estimate the distance to another device.

In another implementation, the first client device and the second client device can use a feature called "advertising" to broadcast their presence to one another when they are within range. When a device receives an advertisement, it can use the signal strength to estimate the distance to the advertising device. For example, in some embodiments, the playback transfer signal could be generated based on whether the devices are detected to be on the same network. In an example use case, the first client device and the second client device are initially not on the same network but come to be on the same network. As described above, there exist various network protocols and mechanisms for broadcasting a device's presence on a local network, such as Address Resolution Protocol (ARP), Simple Service Discovery Protocol (SSDP), Bonjour (formerly known as Zeroconf), and Universal Plug and Play (UPnP).

In an example implementation, the first client device and the second client device are logged into the same user account.

In some embodiments, the first client device and the second client device are not logged into the same user account. However, the user account logged in at the first client device and the user account logged in at the second client device may be associated with each other. For instance, the user account logged in at the first client device and the user account logged in at the second client device could be part of a family account or a family subscription account associated with the same media streaming service provider.

Upon detection of the playback transfer signal, playback context information is communicated from the first client device to the second client device (e.g., via any one of the first client device, an edge device, a backend server, and a middleware component).

Upon receiving the playback content information and the types of dynamic-segments metadata, in some embodiments, a determination is made as to which dynamic-segment metadata the second client device should use. In some embodiments, the determination as to which dynamic-segment metadata the second client device should use is based on the one or more client device characteristics of the second client device. In an example implementation, the determination of the one or more of the client device characteristics (e.g., of the second client device) may be conducted in real time when a playback transfer signal is detected. In some embodiments, the determination of the one or more client device characteristics is based on previously recorded client device characteristics that have been stored in another client device (e.g., the first client device).

In some embodiments, whether one or more device characteristics need to be obtained is triggered based one or more factors. For example, the initiation of a determination of the one or more of the client device characteristics may triggered based on factors such as, but not limit to, network quality, network availability, information of Quality of Service (QOS) associated with the networked device (e.g., router) and the like. If, for example, if the network connection is very good, the second client device may be queried to determine whether the second client device can stream higher quality video than what was playing on the first client device.

In an example implementation, when the first client device performs a playback transfer, the first client device operates to transfer and/or cast playback for a segment (e.g., a media content item, URI, etc.) of an episode that is currently playing, a segment that is about to play, or a predefined number of segments. In some embodiments, the second client device, as the recipient, only plays a segmented media content item that has been set.

In an example use case, a show containing one or more dynamic segments may involve different high bit-rate video content and/or audio content. However, the current network load or the network connection quality issue may affect the second client device's ability to directly obtain high bit-rate or high-resolution video and/or audio data from the backend server. At this time, the first client device can dynamically decide to perform this determination operation again based on the upcoming transfer playback of segmented media content.

In some embodiments, the determination as to which metadata the second device should use is based on metadata including dynamic-segment metadata that is received from the first client device. In addition, the determination can be performed by any one of the second client device, an edge device, a backend server, and a middleware component, depending on the implementation and/or use case.

Dynamic-segment metadata may include one or more links corresponding media content items. Upon a determination the second client device supports a data format corresponding to a media content item addressed by a link in the dynamic-segment metadata, the second client device proceeds to retrieve the dynamic-segment metadata selected particularly for it (i.e., the second client device). The playback of the dynamic segment content at the second client device using the dynamic-segment metadata is controlled, at least in part, based on the playback context information associated with the dynamic segment content. In an example implementation, this causes the corresponding content associated with the dynamic segments that were being played back by the first client device to be paused. The pause command that pauses the corresponding content associated with the dynamic segments that were being played back by the first client device can be issued by via any one of the first client device, the second client device, an edge device, a backend server, and a middleware component.

In some embodiments, if a client device detects that the current playback of the dynamic segments content is for only one of plural types of retrieved dynamic-segments metadata then the client device can operate to automatically delete the unused dynamic-segments metadata associated with the unused types of retrieved dynamic-segments metadata to save storage space. For example, if the first client device detects a user's current playback is maintained only on the first client device for a predefined period of time, and only one of the retrieved types of dynamic-segments metadata is used for the predefined period of time, then the first client device can operate to automatically delete the unused dynamic-segments metadata. The use and automatic deletion can also be controlled by via any one of the first client device, the second client device, an edge device, a backend server, and a middleware component. For example, if the user plays the dynamic segments content consecutively for five hours, where five hours is defined as the predefined period of time, then the playback transfer to a second client device determined not to be an option (i.e., presumed will not occur) and the first client device operates to delete the unused dynamic-segments metadata to save on storage space. In some embodiments, the automatic deletion operations described in connection with dynamic-segment metadata can also be performed on static-segment metadata.

In some embodiments, different output for dynamic segments is provided to a client device 602 according to the one or more client device characteristics of the client device 602. In the example implementation depicted in FIG. 6, a client device 602 can be a mobile device 602a, a television embedded client device 602b, and a speaker embedded client device 602c. When an episode with one or more dynamic segments is played for the first time, dynamic-segments provider system 600 can fetch and store all the supported links (e.g., URIs) for each dynamic segment. In some embodiments, any given dynamic segment can resolve to content that is any one or a combination of audio, video, or text. The response is shared to the client devices 602 and each client device 602 determines which output to render according to its capabilities (e.g., audio, video, text, etc.). For example, if the client device is a speaker embedded client device 602c, the speaker embedded client device 602c will select audio output to render. In the case the client device is a television embedded client device then the device may choose to render video output.

In some embodiments, the volume of data is reduced by transferring only relevant links (e.g., URIs) for dynamic segments. For example, when playing media content on a speaker embedded client device, there is no benefit of transferring video URI.

In an example embodiment, player service 804 operates to transferring dynamic-segment metadata across media playback devices. The player service 804 executes a detection operation that performs detecting a transfer signal indicating a playback session is to be transferred from a first media playback device to a second media playback device, where the playback session containing first dynamic-segment metadata corresponding to a first dynamic-segment having a first data format. In turn, a retrieving operation performs retrieving second dynamic-segment metadata corresponding to a second dynamic-segment having a second data format. In turn, the player service 804 causes the second media playback device to play the second dynamic-segment using the second dynamic-segment metadata, where the first data format and the second data format are different.

In some embodiments, the player service 804 determines, based on the first dynamic-segment metadata, that the first dynamic segment corresponds to the first data format, obtains one or more client device characteristics for the second media playback device that identifies one or more types of data formats that the second media playback device is capable of processing, and obtains the second dynamic-segment metadata based on the one or more client device characteristics.

In some embodiments, the player service 804 obtains, from the first dynamic-segment metadata, two or more media content items corresponding to the first dynamic segment, where the two or more media items correspond to different data formats and communicates to the second media device the two or more media content items. In an example implementation, each of the two or more media content items is a unique identifier for obtaining a corresponding media content item.

In some embodiments, the different data formats include any one of (a) an audio format, (b) a video format, (c) a text format, (d) a browser format, or (e) an image format.

In some embodiments, the different data formats include combinations of (a) an audio format, (b) a video format, (c) a text format, (d) a browser format, and (e) an image format. (e.g., audio/video vs. audio; audio/text vs. video; video vs. audio/image).

In some embodiments, the player service 804 generates the transfer signal according to a change of location of the first media playback device.

In some embodiments, the player service 804 generates the transfer signal according to a detection of a playback transfer command received by the first media playback device or the second media playback device.

In some embodiments, upon detecting the playback transfer signal, the player service 804 communicates playback context information (e.g., playback position) corresponding to the playback session on the first media playback device to the second media playback device and causes the second media playback device to play the second segment according to the playback context information.

In some embodiments, the player service 804 deletes data associated with the second segment from the first device if the playback session has been playing on the first media playback device for a predetermined amount of time.

In some embodiments, the playback session includes one or more dynamic segments and one or more static segments, and wherein the first segment is a dynamic segment.

In some embodiments, the first segment and the second segment correspond to different versions of the same media content item (e.g., one media content item is the audio version of a news clip and the other media content item is an audiovisual version of the same news clip).

In some embodiments, the playback service causes the first media playback device to play audio content of the second dynamic segment such that causing the second media playback device to play the second dynamic-segment using the second dynamic-segment metadata causes the second media playback device to play non-audio content of the second dynamic-segment in synchrony.

Figure 7:
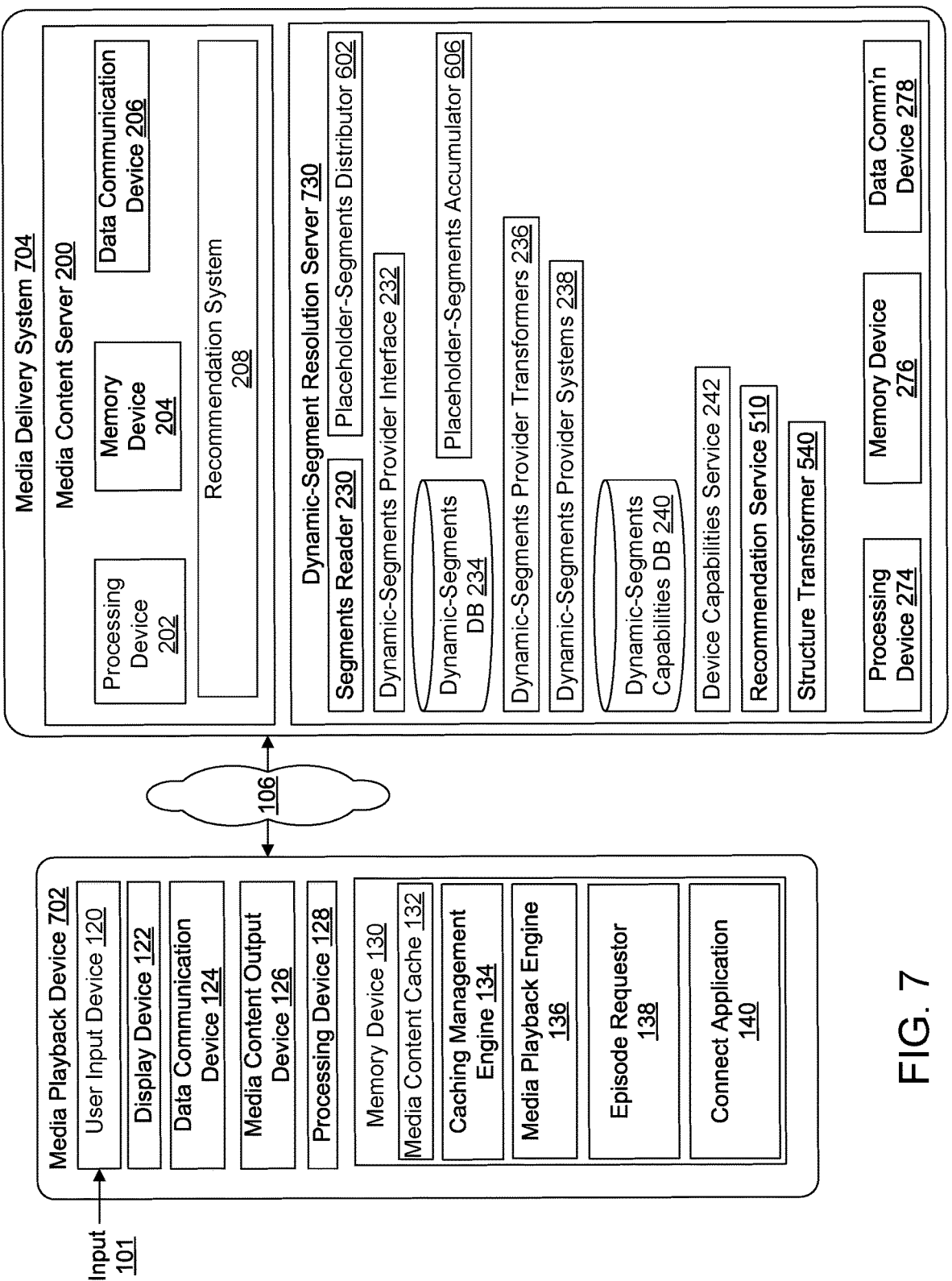
FIG. 7 is a representative view of a system in which some embodiments of the invention may be implemented.

Example System Implementation. FIG. 7 is a representative view of a system in which some embodiments of the invention may be implemented. The system includes a media playback device 702 and a media delivery system 704. Media playback device 702 can be a client device 102 of FIG. 1, client device 502 of FIG. 5, or client device 602 of FIG. 6. The media delivery system 704 operates to provide media content to one or more media playback devices 702, such as the media playback device 702, via the network 106.

In this document, the media content that is currently playing, queued to be played, or has been previously played can be represented as a first media content item. In addition, the media content that will be played after the first media content item is referred to as a second media content item. Further, the media content that will be played after the second media content item is referred to as a third media content item. The first media content item, the second media content item, and the third media content item can be of various types. In some use cases, however, the media playback device 702 cannot playback all types of media content.

The media playback device 702 includes a user input device 120, a display device 122, a data communication device 124, a media content output device 126, a processing device 128, and a memory device 130.

The media playback device 702 operates to play media content. For example, the media playback device 702 is configured to play media content that is provided (e.g., streamed or transmitted) by a system external to the media playback device 702, such as the media delivery system 704, another system, or a peer device. In other examples, the media playback device 702 operates to play media content stored locally on the media playback device 702. In yet other examples, the media playback device 702 operates to play media content that is stored locally as well as media content provided by other systems.

In some embodiments, the media playback device 702 is a handheld or portable entertainment device, smart speaker, smartphone, tablet, watch, wearable device, or any other type of computing device capable of playing certain types of media content (e.g., audio, video, text, etc.). In other embodiments, the media playback device 702 is a laptop computer, desktop computer, television, gaming console, set-top box, network appliance, blue-ray or DVD player, media player, stereo, or radio, etc.

A user input device 120 of media playback device 702 operates to receive a user input from a user for controlling the media playback device 702. The user input can include a manual input and/or a voice input. In some embodiments, the user input device 120 includes one or more buttons, keys, touch levers, switches, and/or other mechanical input devices for receiving the input 101.

In some embodiments, the user input device 120 can detect sounds including the voice input such as a voice of a user (e.g., an utterance) for controlling playback of media content via the media playback device 702.

In some embodiments, a display device 122 is provided that operates to display a graphical user interface that displays information for interacting with the media playback device 702. Examples of such information include media content playback information, notifications, and other information. In some embodiments, the display device 122 is configured as a touch sensitive display and includes the user input device 120 for receiving the input 101 from a selector (e.g., a finger, stylus etc.) controlled by a user. In some embodiments, therefore, the display device 122 operates as both a display device and a user input device.

The data communication device 124 operates to enable the media playback device 702 to communicate with one or more computing devices over one or more networks, such as the network 106. For example, the data communication device 124 is configured to communicate with the media delivery system 704 and receive media content from the media delivery system 704 at least partially via the network 106. The data communication device 124 can be a network interface of various types which connects the media playback device 702 to the network 106.

The media content output device 126 operates to output media content (e.g., via one or more speakers which are incorporated in the media playback device 702 or via external speaker such as headphones, a portal speaker, a vehicle entertainment system, etc.).

The processing device 128, in some embodiments, comprises one or more central processing units (CPU). In other embodiments, the processing device 128 additionally or alternatively includes one or more digital signal processors, graphical processing units (GPUs), field-programmable gate arrays, or other electronic circuits.

The memory device 130 typically includes at least some form of non-transitory computer-readable media. Non-transitory computer-readable media includes any available media that can be accessed by the media playback device 702, such as volatile and nonvolatile, removable and non-removable media implemented in any device configured to store information such as computer readable instructions, data structures, program modules, or other data. Memory device 130 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 702 in a non-transitory manner.

The memory device 130 operates to store data and instructions. In some embodiments, the memory device 130 stores instructions for a caching management engine 134, a media playback engine 136, an episode requestor 138, and a connect application 140.

Some embodiments of the memory device 130 include a media content cache 132. The media content cache 132 stores media content items, such as media content items that have been received from the media delivery system 704. In some embodiments, the media content cache 132 also stores metadata about media content items such as title, artist name, album name, length, genre, mood, era, etc. The media content cache 132 can further store playback information about the media content items and/or other information associated with the media content items.

The caching management engine 134 is configured to receive and cache media content in the media content cache 132 and manage the media content stored in the media content cache 132. In some embodiments, when media content is streamed from the media delivery system 704, the caching management engine 134 operates to cache at least a portion of the media content into the media content cache 132. In other embodiments, the caching management engine 134 operates to cache at least a portion of media content into the media content cache 132 while online so that the cached media content is retrieved for playback while the media playback device 702 is offline.

The media playback engine 136 operates to play media content to a user. As described herein, the media playback engine 136 is configured to communicate with the media delivery system 704 to receive one or more media content items (e.g., through a media stream). In other embodiments, the media playback engine 136 is configured to play media content that is locally stored in the media playback device 702.

In some embodiments, the media playback engine 136 operates to retrieve one or more media content items that are either locally stored in the media playback device 702 or remotely stored in the media delivery system 704. In some embodiments, the media playback engine 136 is configured to send a request to the media delivery system 704 for media content items and receive information about such media content items for playback.

In some embodiments, an episode requestor 138 operates to request the media delivery system 704 to deliver episode metadata including at least dynamic-segment metadata. In some use cases, the episode metadata also includes static-segment metadata.

In some embodiments, the connect application 140 operates to connect devices that also support a connect application. When two or more devices use a particular application, such as the connect application, to communicate with each other, they are compatible devices. Connect application 140, in some embodiments, includes instructions that, when executed by the one or more processing devices 128 of the media playback device 702, perform a connect-state service to provide information corresponding to client device including, for example, corresponding playback context information. In some embodiments, connect application 140 includes instructions that, when executed by the one or more processing devices 128 of the media playback device 702, perform a player service 804 to orchestrate the transfer of dynamic-segment metadata across media playback devices.

Media delivery system 704 includes a media content server 200, a recommendation system 208, and a dynamic-segment resolution server 730.

Media delivery system 704 interacts with the media playback device 702 to provide the media playback device 702 with various functionalities.

In at least some embodiments, the media content server 200 and the dynamic-segment resolution server 730 (or components thereof) are provided by separate computing devices. In other embodiments, the media content server 200 and the dynamic-segment resolution server 730 are provided by the same computing device(s).

The media content server 200 transmits stream media to media playback devices such as the media playback device 702. In some embodiments, the media content server 200 includes a processing device 202, a memory device 204, and a data communication device 206. The processing device 202 and the memory device 204 may be similar to the processing device 128 and the memory device 130, respectively, which have each been previously described. Therefore, the description of the processing device 202 and the memory device 204 are omitted for brevity purposes.

The data communication device 206 operates to communicate with other computing devices over one or more networks, such as the network 106. Examples of the data communication device include one or more wired network interfaces and wireless network interfaces.

In some embodiments, media content server 200 executes a media server application configured to stream media content, such as music or other audio, video, or other suitable forms of media content. The media server application can include a media stream service that operates to buffer media content, such as media content items, for streaming to one or more media streams.

The media content server 200 can receive requests or other communication from media playback devices or other systems, such as the media playback device 702, to retrieve media content items from the media content server 200.

In some embodiments, media content server 200 stores media content items, media content metadata, media contexts, user accounts, and taste profiles.

Media content items may be audio, video, podcasts or any other type of media content, which may be stored in any data format for storing media content.

Media content metadata, as used herein, provides various information (also referred to herein as attribute(s)) associated with the media content items. In addition, or alternatively, the media content metadata provides various information associated with the media contexts. In some embodiments, the media content metadata includes one or more of title, artist name, album name, length, genre, mood, era, etc.

Dynamic-segment metadata and static-segment metadata can include media content metadata or vice versa.

Media contexts can include playlists. The playlists are used to identify one or more of the media content items. In some embodiments, the playlists identify a group of the media content items in a particular order. In other embodiments, the playlists merely identify a group of the media content items without specifying a particular order. Some, but not necessarily all, of the media content items included in a particular one of the playlists are associated with a common characteristic such as a common genre, mood, or era.

In some embodiments, a user can listen to media content items in a playlist by selecting the playlist via a media playback device, such as the media playback device 702. The media playback device 702 then operates to communicate with the media delivery system 704 so that the media delivery system 704 retrieves the media content items identified by the playlist and transmits data for the media content items to the media playback device for playback.

In some embodiments, the playlist includes one or more playlist descriptions. The playlist descriptions include information associated with the playlist. The playlist descriptions can include a playlist title. In some embodiments, the playlist title can be provided by a user using the media playback device 702. In other embodiments, the playlist title can be provided by a media content provider (or a media-streaming service provider). In yet other embodiments, the playlist title can be automatically generated.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist. Each term of the description vector indicates the probability that a corresponding word or phrase would be used to describe the associated track, album or artist.

In some embodiments, the playlist includes a list of media content item identifications (IDs). The list of media content item identifications includes one or more media content item identifications that refer to respective media content items. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata, which can further include other attributes of the media content item, such as album name, length, genre, mood, cra, etc. as described herein.

At least some of the playlists may include user-created playlists. For example, a user of a media streaming service provided using the media delivery system 704 can create a playlist and edit the playlist by adding, removing, and rearranging media content items in the playlist. A playlist can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 704 operates to generate a list of media content items recommended for the particular user or the particular group of users. In some embodiments, such recommended media content items can be selected based at least on the taste profiles as described herein. Other information or factors can be used to determine the recommended media content items.

In addition, or alternatively, at least some of the playlists are created by a media streaming service provider. For example, such provider-created playlists can be automatically created by the media delivery system 704. In some embodiments, a provider-created playlist can be customized to a particular user or a particular group of users. By way of example, a playlist for a particular user can be automatically created by the media delivery system 704 based on the user's listening history (e.g., the user's taste profile) and/or listening history of other users with similar tastes. In other embodiments, a provider-created playlist can be configured to be available for the public in general. Provider-created playlists can also be sharable with other users.

Referring still to FIG. 7, in some embodiments, dynamic-segment resolution server 730 includes a segments reader 230, a dynamic-segments provider interface 232, a dynamic-segments DB 234, one or more dynamic-segments provider transformers 236, one or more dynamic-segments provider systems 238, a dynamic-segments capabilities DB 240, a device capabilities service 242, a placeholder-segments distributor 608, and a dynamic segments accumulator 606.

In some embodiments, dynamic-segment resolution server 730 includes a recommendation service 510 that operates to obtain personalized dynamic-segment metadata to be inserted into the episode metadata, for example, by making a call to recommendation system 208.

In some embodiments, the dynamic-segment resolution server 730 includes a processing device 274, a memory device 276, and a data communication device 278. The processing device 274, the memory device 276, and the data communication device 278 for dynamic-segment resolution server 730 may be similar to the processing device 202, the memory device 204, and the data communication device 206, respectively, which have each been previously described.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments but should be defined only in accordance with the following claims and their equivalents.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terminology used herein is for the purpose of describing particular examples only and is not intended to be limiting. As used herein, the singular forms "a", "an" and "the" are intended to include the plural forms as well, unless the context clearly indicates otherwise.

Illustrative examples of the disclosure are described below. In the interest of clarity, not all features of an actual implementation are described in this specification. It will of course be appreciated that in the development of any such actual example, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Software embodiments of the example embodiments presented herein may be provided as a computer program product, or software, that may include an article of manufacture on a machine accessible or machine-readable medium having instructions. The instructions on the machine accessible or machine-readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The performance of the one or more actions enables enhanced and automated selection and output of the data corresponding to media content. This means that data which is selected and output according to the processes described herein are of enhanced contextual relevance and in this regard can be automatically selected and output at significantly improved rates, for example, the throughput of data selection to its output, or speed of data selection is significantly enhanced. The data which is automatically selected and output according to the processes described herein can thus be pre-emptively obtained and stored locally within a computer, or transmitted to the computer, such that the selected data is immediately accessible and relevant to a local user of the computer.

Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method comprising:
    receiving a request for episode metadata corresponding to an episode;
    determining that the episode metadata includes one or more dynamic segments;
    determining that a dynamic-segments database does not contain dynamic-segment metadata associated with the one or more dynamic segments;
    causing one or more dynamic-segments transformers to resolve the one or more dynamic segments, thereby obtaining the dynamic segment metadata associated with the one or more dynamic segments;

injecting the obtained dynamic-segment metadata into the episode metadata; and providing, to a client device associated with the request, the requested episode metadata including the injected dynamic-segment metadata.

2. The method of claim 1, further comprising:

storing the obtained dynamic-segment metadata in the dynamic-segments database.

3. The method of claim 1, further comprising:

resolving, by the one or more dynamic-segment transformers, the one or more dynamic segments to obtain the given dynamic-segment metadata associated with the one or more dynamic segments, by requesting from one or more dynamic segments provider systems the dynamic-segment metadata associated with the one or more dynamic segments and receiving, in response from the one or more dynamic segments provider systems the dynamic-segment metadata associated with the one or more dynamic segments.

4. The method of claim 1, further comprising:

generating static-segment metadata and the dynamic-segment metadata, wherein the static-segment metadata does not change between playbacks of the episode and the dynamic-segment metadata changes between at least two playbacks during a predetermined time interval.

5. The method of claim 1, further comprising:

retrieving, from a segments database, prestored-segment metadata corresponding to at least one of a plurality of segments forming the episode, the prestored-segment metadata including static-segment metadata and the dynamic-segment metadata, the static-segment metadata including a static-segment identifier for retrieving a corresponding static media content item, and the dynamic-segment metadata including a dynamic-segment identifier.

6. The method of claim 1, further comprising:

detecting a transfer signal indicating that a playback session is to be transferred from a first media playback device to a second media playback device, the playback session containing first dynamic-segment metadata corresponding to a first dynamic-segment having a first data format;

determining second dynamic-segment metadata that the second media playback device should use to facilitate playing a second dynamic segment having a second format;

based on the determining of the second dynamic-segment metadata, retrieving the second dynamic-segment metadata; and causing the second media playback device to play the second dynamic-segment using the retrieved second dynamic-segment metadata, wherein the first data format and the second data format are different.

7. The method of claim 6, further comprising:

determining, based on the first dynamic-segment metadata, that the first dynamic-segment corresponds to the first data format; and obtaining one or more client device characteristics for the second media playback device that identifies one or more types of data formats that the second media playback device is capable of processing, wherein determining the second dynamic-segment metadata is based on the one or more client device characteristics.

8. The method of claim 6, further comprising:

obtaining, from the first dynamic-segment metadata, two or more media content items corresponding to the first dynamic segment, wherein the two or more media items correspond to different data formats; and communicating to the second media device the two or more media content items.

9. The method of claim 8, wherein each of the two or more media content items has a unique identifier for obtaining a corresponding media content item.

10. The method of claim 6, wherein the first data format and the second data format are each selected from the group consisting of (a) an audio format, (b) a video format, (c) a text format, (d) a browser format, and (e) an image format.

11. The method of claim 6, wherein the first data format and the second data format each include respectively a unique combination of data formats selected from the group consisting of (a) an audio format, (b) a video format, (c) a text format, (d) a browser format, and (e) an image format.

12. The method of claim 6, further comprising:

generating the transfer signal according to a change of location of the first media playback device.

13. The method according to claim 6, further comprising:

generating the transfer signal according to a detection of a playback transfer command received by the first media playback device or the second media playback device.

14. The method of claim 6, further comprising:

upon detecting the playback transfer signal, communicating playback context information corresponding to the playback session on the first media playback device to the second media playback device; and causing the second media playback device to play the second dynamic segment according to the playback context information.

15. The method of claim 6, further comprising:

deleting data associated with the second dynamic segment from the first device if the playback session has been playing on the first media playback device for a predetermined amount of time.

16. The method of claim 6, wherein the playback session includes one or more dynamic segments and one or more static segments, and wherein the one or more dynamic segments includes the first dynamic-segment.

17. The method of claim 6, wherein the first dynamic-segment and the second dynamic-segment correspond to different versions of a same media content item.

18. The method of claim 6, further comprising:

causing the first media playback device to play audio content of the second dynamic segment; and wherein causing the second media playback device to play the second dynamic-segment using the second dynamic-segment metadata causes the second media playback device to play non-audio content of the second dynamic-segment in synchrony.

19. A system comprising:

one or more processors;

memory; and program instructions stored in the memory and executable by the one or more processors to perform operations including:

receiving a request for episode metadata corresponding to an episode, determining that the episode metadata includes one or more dynamic segments, determining that a dynamic-segments database does not contain dynamic-segment metadata associated with the one or more dynamic segments, causing one or more dynamic-segments transformers to resolve the one or more dynamic segments, thereby obtaining the dynamic segment metadata associated with the one or more dynamic segments, injecting the obtained dynamic-segment metadata into the episode metadata, and providing, to a client device associated with the request, the requested episode metadata including the injected dynamic-segment metadata.

20. A non-transitory computer-readable medium having stored thereon one or more sequences of instructions for causing one or more processors to perform operations comprising:

receiving a request for episode metadata corresponding to an episode;

determining that the episode metadata includes one or more dynamic segments;

determining that a dynamic-segments database does not contain dynamic-segment metadata associated with the one or more dynamic segments;

causing one or more dynamic-segments transformers to resolve the one or more dynamic segments, thereby obtaining the dynamic segment metadata associated with the one or more dynamic segments;

injecting the obtained dynamic-segment metadata into the episode metadata; and providing, to a client device associated with the request, the requested episode metadata including the injected dynamic-segment metadata.

* * * * *